US 6,565,206 B2

(12) United States Patent
Okabe et al.

(10) Patent No.: US 6,565,206 B2
(45) Date of Patent: *May 20, 2003

(54) INK-JET PRINT METHOD AND APPARATUS, COLOR FILTER, DISPLAY DEVICE, AND APPARATUS HAVING DISPLAY DEVICE

(75) Inventors: Tetsuo Okabe, Kawasaki (JP); Hiroshi Fujiike, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,768

(22) Filed: Sep. 24, 1997

(65) Prior Publication Data

US 2002/0109741 A1 Aug. 15, 2002

(30) Foreign Application Priority Data

Sep. 30, 1996 (JP) .............................................. 8-259904
Sep. 11, 1997 (JP) .............................................. 9-246927

(51) Int. Cl.$^7$ .................................................. B41J 2/01
(52) U.S. Cl. ...................................................... 347/107
(58) Field of Search ............................. 347/15, 12, 13, 347/106, 107; 400/7

(56) References Cited

U.S. PATENT DOCUMENTS

| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,608,577 A | 8/1986 | Hori |
| 4,614,967 A | * 9/1986 | Sayanagi ..................... 358/75 |
| 4,631,548 A | * 12/1986 | Milbrandt .................... 347/43 |
| 4,723,129 A | 2/1988 | Endo et al. |
| 4,740,796 A | 4/1988 | Endo et al. |
| 5,216,445 A | * 6/1993 | Hirasawa et al. ............. 347/15 |
| 5,281,450 A | * 1/1994 | Yaniv ........................ 347/107 |
| 6,164,746 A | * 12/2000 | Akahira et al. ............... 347/15 |

FOREIGN PATENT DOCUMENTS

| EP | 0 559 370 | 9/1993 |
| EP | 0 600 707 | 6/1994 |
| EP | 0 631 257 | 12/1994 |
| EP | 0 704 722 | 4/1996 |
| EP | 0 730 367 | 9/1996 |
| EP | 0 744 706 | 11/1996 |
| JP | 54-56847 | 5/1979 |
| JP | 59-75205 | 4/1984 |
| JP | 59-123670 | 7/1984 |
| JP | 59-138461 | 8/1984 |
| JP | 60-71260 | 4/1985 |
| JP | 60-107975 | 6/1985 |
| JP | 63-235901 | 9/1988 |
| JP | 1-217320 | 8/1989 |
| JP | 1-285360 | 11/1989 |
| JP | 6-191041 | 7/1994 |
| JP | 8-230314 | 10/1996 |

* cited by examiner

Primary Examiner—John Barlow
Assistant Examiner—Michael S. Brooke
(74) Attorney, Agent, or Firm—Fitzpatrick, Cella, Harper & Scinto

(57) ABSTRACT

It is an object of the present invention to provide an ink-jet print method which can uniformly distribute inks within each pixel array when a color filter is to be colored in a plurality of scanning operations. In order to achieve this object, there is provided an ink-jet print method of coloring each pixel array on a substrate by using an ink-jet head having a plurality of ink discharging nozzles while changing the ink discharging nozzle used to color one line for every scanning operation, including discharging the inks discharged in the plurality of scanning operations such that the inks are arranged at equal intervals within each pixel array.

16 Claims, 27 Drawing Sheets

RESULT OBTAINED
BY MEASURING
VARIATIONS IN AMOUNT
OF INK DISCHARGED

NOZZLE 1   −10%
NOZZLE 2   +20%
NOZZLE 3   ±0%

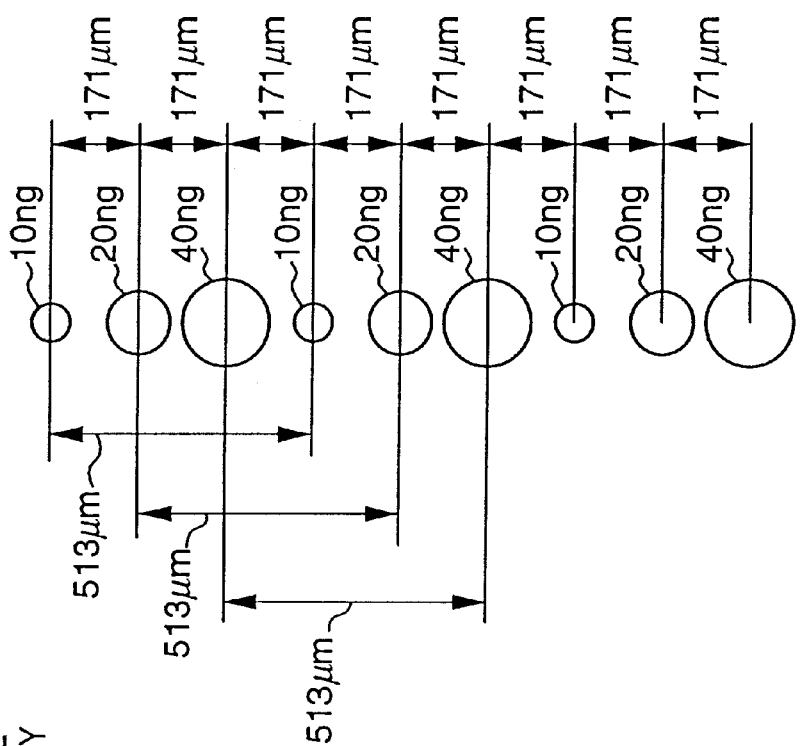
FIG. 28
FIG. 27
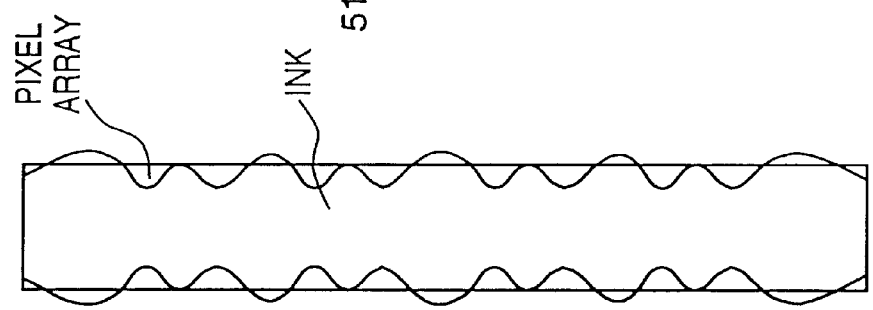
FIG. 26
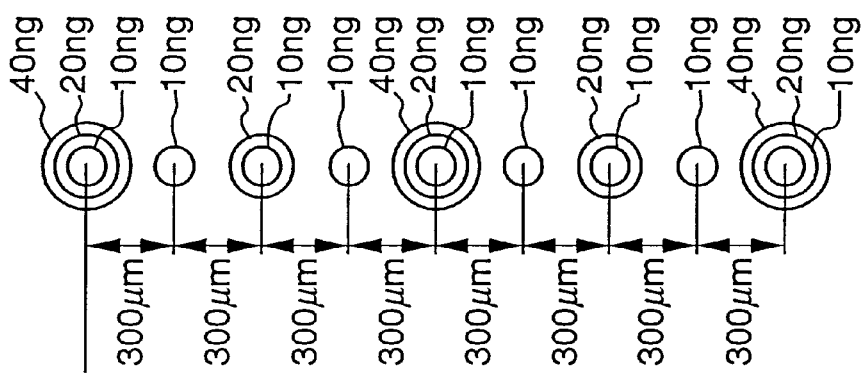

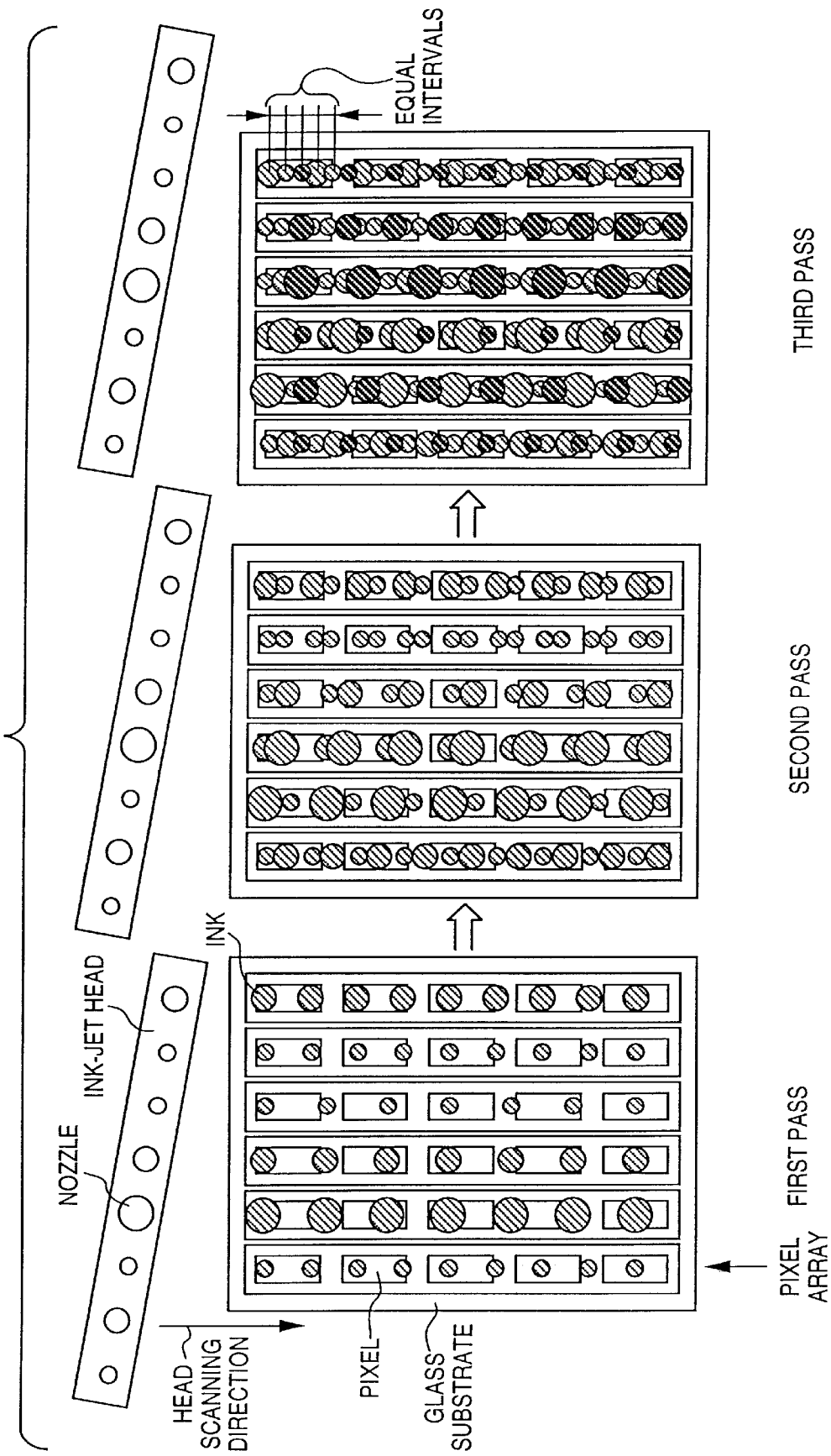

INK-JET PRINT METHOD AND APPARATUS, COLOR FILTER, DISPLAY DEVICE, AND APPARATUS HAVING DISPLAY DEVICE

BACKGROUND OF THE INVENTION

The present invention relates to an ink-jet print method and apparatus for performing a print operation by discharging an ink from an ink-jet head onto a recording member, a color filter, a display device, and an apparatus having the display device.

With recent advances in personal computers, especially portable personal computers, the demand tends to arise for liquid crystal displays, especially color liquid crystal displays. However, in order to further popularize the use of liquid crystal displays, a reduction in cost must be achieved. Especially, it is required to reduce the cost of a color filter which occupies a large proportion of the total cost. Various methods have been tried to satisfy the required characteristics of color filters while meeting the above requirements. However, any method capable of satisfying all the requirements has not been established. The respective methods will be described below.

The first method is a pigment dispersion method. In this method, a pigment-dispersed photosensitive resin layer is formed on a substrate and patterned into a single-color pattern. This process is repeated three times to obtain R, G, and B color filter layers.

The second method is a dyeing method. In the dyeing method, a water-soluble polymer material as a dyeable material is applied onto a glass substrate, and the coating is patterned into a desired shape by a photolithographic process. The obtained pattern is dipped in a dye bath to obtain a colored pattern. This process is repeated three times to form R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are calcined.

The fourth method is a print method. In this method, a pigment is dispersed in a thermosetting resin, a print operation is performed three times to form R, G, and B coatings separately, and the resins are thermoset, thereby forming colored layers. In either of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, it is difficult to apply this method to TFTs. In the print method, a pattern with a fine pitch is difficult to form because of poor resolution and poor evenness.

In order to eliminate these drawbacks, methods of manufacturing color filters by an ink-jet system are disclosed in Japanese Patent Laid-Open Nos. 59-75205, 63-235901, and 1-217320. In these methods, inks containing coloring agents of three colors, i.e., R (red), G (green), and B (blue), are sprayed on a transparent substrate by an ink-jet system, and the respective inks are dried to form colored image portions.

In such an ink-jet system, R, G, and B pixels can be formed at once, allowing great simplification of the manufacturing process and a great reduction in cost.

When a color filter is to be manufactured by such an ink-jet system, an ink may be discharged onto each pixel to color each pixel portion while an ink-jet head having a plurality of ink discharging nozzles is scanned over a color filter substrate. In this case, however, since the amounts of ink discharged from a plurality of ink discharging nozzles slightly vary, if one pixel array is colored by one nozzle, adjacent pixel arrays are colored by nozzles whose ink discharging amounts differ from each other. It is known, therefore, that color irregularity occurs between the pixel arrays. To reduce such color irregularity, a method of performing a scanning operation a plurality of times, and coloring pixel arrays by using different nozzles in the respective scanning operations has been proposed. In this method of coloring each pixel array by performing a scanning operation a plurality of times, however, inks discharged in the respective scanning operations may overlap at some portions in each pixel array, resulting in an insufficient effect of reducing the color irregularity, unless the manner of distributing inks in the respective scanning operations is studied.

SUMMARY OF THE INVENTION

The present invention has therefore been made in consideration of the above problems, and has as its object to provide an ink-jet print method and apparatus which can uniformly distribute inks within each line when the each line is to be printed in a plurality of scanning operations.

It is another object of the present invention to provide a color filter manufactured by the above print method and apparatus, a display device using the color filter, and an apparatus having the display device.

In order to solve the above problems and achieve the above objects, an ink-jet print method according to the present invention is characterized by the following process.

There is provided an ink-jet print method for printing lines on a recording member, in which each line is printed on a recording member by a plurality of scanning operations of an ink-jet head having a plurality of ink discharging nozzles while changing the ink discharging nozzle used to print the each line for every scanning operation, comprising discharging the inks discharged in the plurality of scanning operations such that the inks are arranged at equal intervals within the each line.

An ink-jet print apparatus according to the present invention is characterized by the following arrangement.

There is provided an ink-jet print apparatus for printing lines on a recording member, in which each line is printed on a recording member by a plurality of scanning operations of an ink-jet head having a plurality of ink discharging nozzles while changing the ink discharging nozzle used to print the each line for every scanning operation, comprising scanning means for scanning the ink-jet head relative to the recording member, and control means for controlling an operation of the scanning means and an ink discharging timing of the ink-jet head such that the inks discharged in the plurality of scanning operations are arranged at equal intervals within the each line.

A color filter according to the present invention is characterized by the following arrangement.

There is provided a color filter manufactured by coloring each pixel array on a substrate by a plurality of scanning operations of an ink-jet head having a plurality of ink discharging nozzles while changing the ink discharging nozzle used to print the each pixel array for every scanning operation, wherein the color filter is manufactured by discharging the inks discharged in the plurality of scanning operations such that the inks are arranged at equal intervals within the each line.

A display device according to the present invention is characterized by the following arrangement.

There is provided a display device including a color filter manufactured by coloring each pixel array on a substrate by a plurality of scanning operations of an ink-jet head having a plurality of ink discharging nozzles while changing the ink discharging nozzle used to print the each pixel array for every scanning operation, integrally comprising the color filter manufactured by discharging the inks discharged in the plurality of scanning operations such that the inks are arranged at equal intervals within the each line, and light amount changing means for changing a light amount.

An apparatus including a display device according to the present invention is characterized by the following arrangement.

There is provided an apparatus including a display device including a color filter manufactured by coloring each pixel array on a substrate by a plurality of scanning operations of an ink-jet head having a plurality of ink discharging nozzles while changing the ink discharging nozzle used to print the each pixel array for every scanning operation, comprising the display device integrally including the color filter manufactured by discharging the inks discharged in the plurality of scanning operations such that the inks are arranged at equal intervals within the each line and light amount changing means for changing a light amount, and image signal supply means for supplying an image signal to the display device.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 26 is a view showing how inks overlap;

FIG. 27 is a view showing how inks spread when they overlap;

FIG. 28 is a view showing a state in which inks are discharged at equal intervals;

FIG. 29 is a view showing the concept of a color filter coloring method according to the embodiment.

DETAILED DESCRIPTION OF THE PREFERRED EMBODIMENTS

A preferred embodiment of the present invention will be described in detail below with reference to the accompanying drawings.

Figure 1:
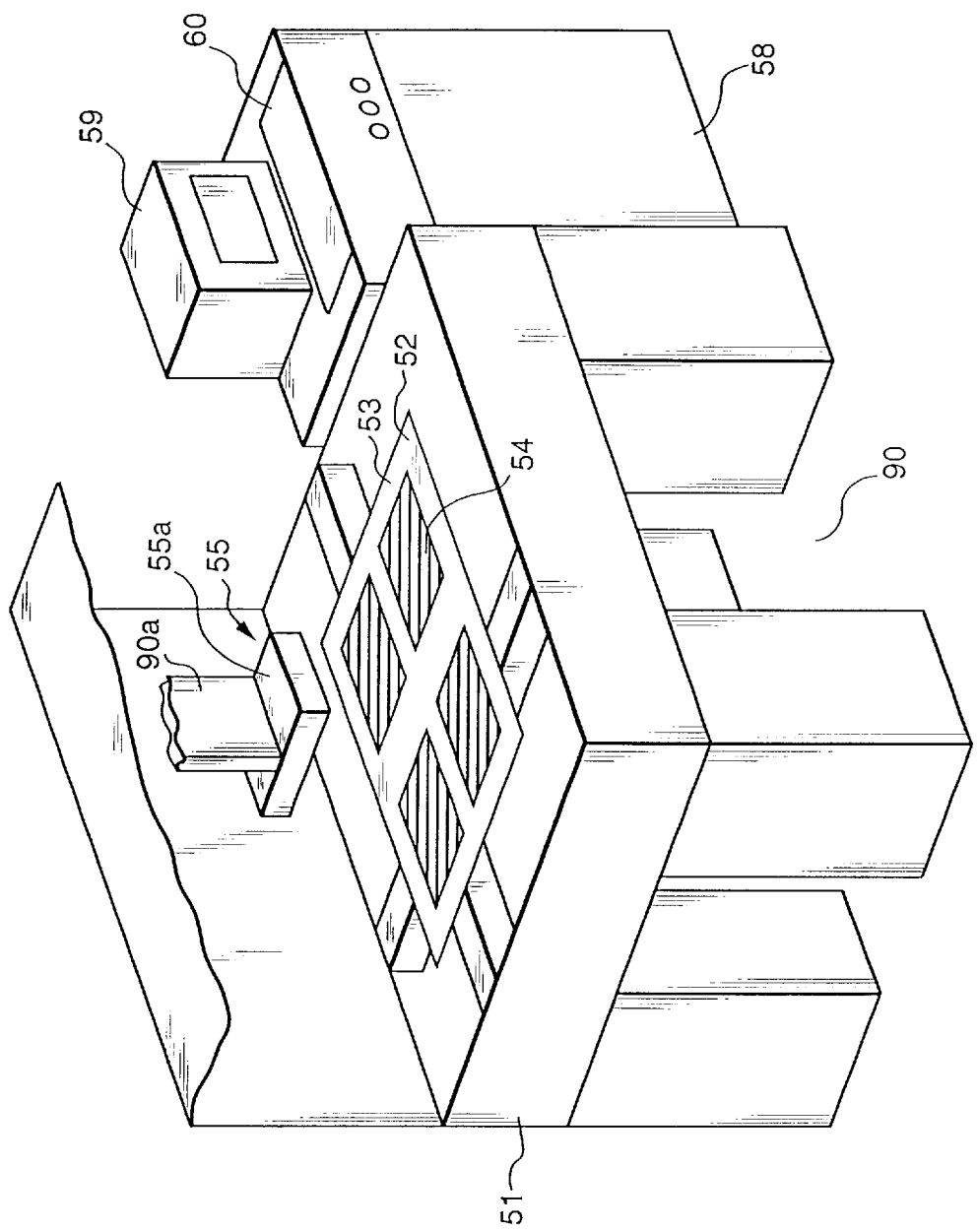
FIG. 1 is a perspective view showing the schematic structure of a color filter manufacturing apparatus according to an embodiment of the present invention.

FIG. 1 is a schematic view showing the structure of a color filter manufacturing apparatus according to an embodiment of the present invention.

Referring to FIG. 1, reference numeral 51 denotes an apparatus base; 52, an X-Y-θ stage disposed on the apparatus base 51; 53, a color filter substrate set on the X-Y-θ stage 52; 54, color filters formed on the color filter substrate 53; 55, a head unit including R (red), G (green), and B (blue) ink-jet heads for coloring the color filters 54 and a head mount 55a supporting these heads; 58, a controller for controlling the overall operation of a color filter manufacturing apparatus 90; 59, a teaching pendant (personal computer) as the display unit of the controller; and 60, a keyboard as the operation unit of the teaching pendant 59.

Figure 2:
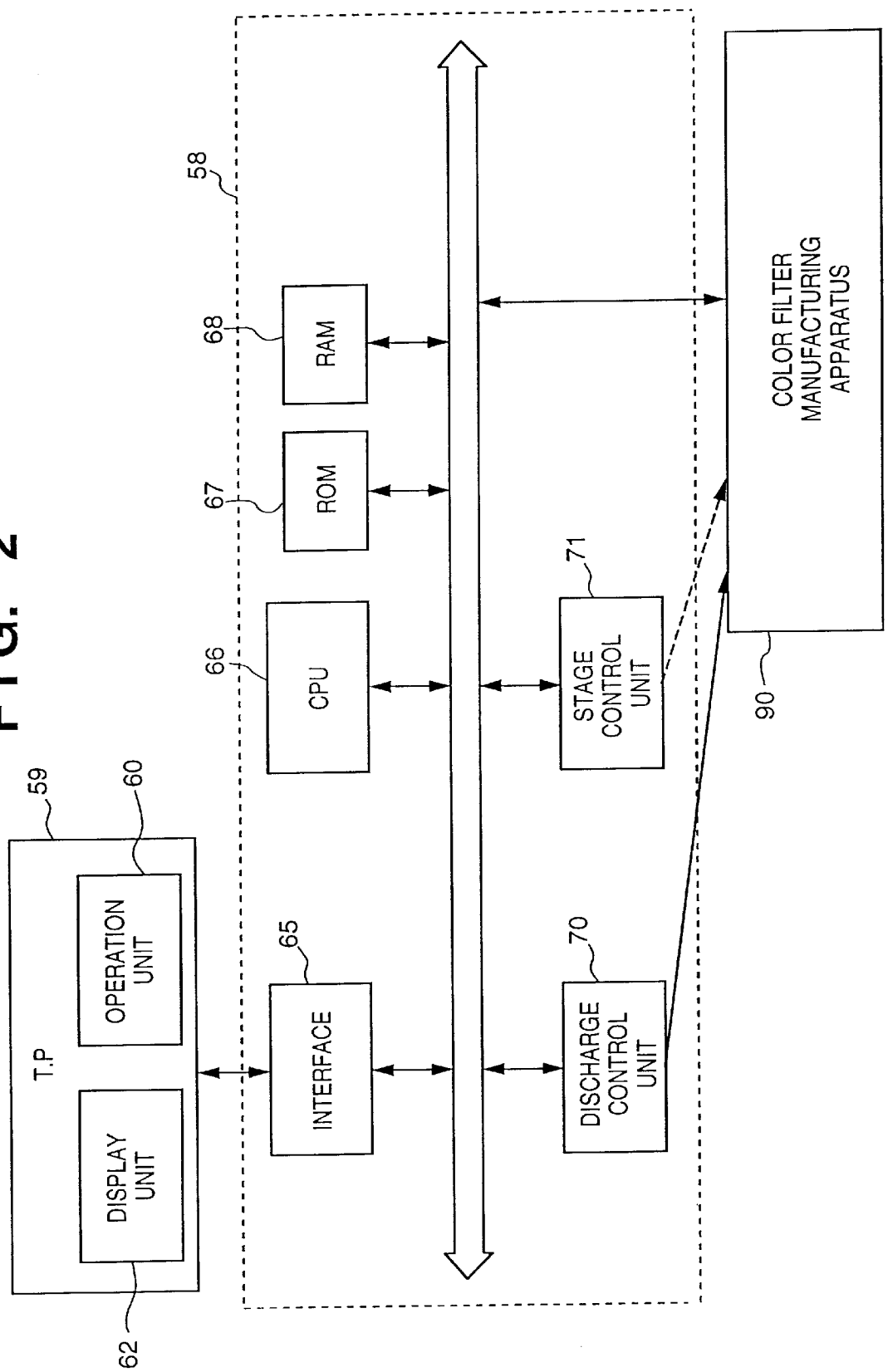
FIG. 2 is a block diagram showing the arrangement of a control unit for controlling the operation of the color filter manufacturing apparatus.

FIG. 2 is a block diagram showing the arrangement of the controller of the color filter manufacturing apparatus 90. The teaching pendant 59 serves as the input/output means of the controller 58. Reference numeral 62 denotes a display unit for displaying how a manufacturing process progresses, information indicating the presence/absence of a head abnormality, and the like. The keyboard 60 designates an operation of the color filter manufacturing apparatus 90 and the like.

The controller 58 controls the overall operation of the color filter manufacturing apparatus 90. Reference numeral 65 denotes an interface for exchanging data with the teaching pendant 59; 66, a CPU for controlling the color filter manufacturing apparatus 90; 67, a ROM storing control programs for operating the CPU 66; 68, a RAM for storing production information and the like; 70, a discharge control unit for controlling discharging of an ink into each pixel of a color filter; and 71, a stage control unit for controlling the operation of the X-Y-$\theta$ stage 52 of the color filter manufacturing apparatus 90. The color filter manufacturing apparatus 90 is connected to the controller 58 and operates in accordance with instructions therefrom.

Figure 3:
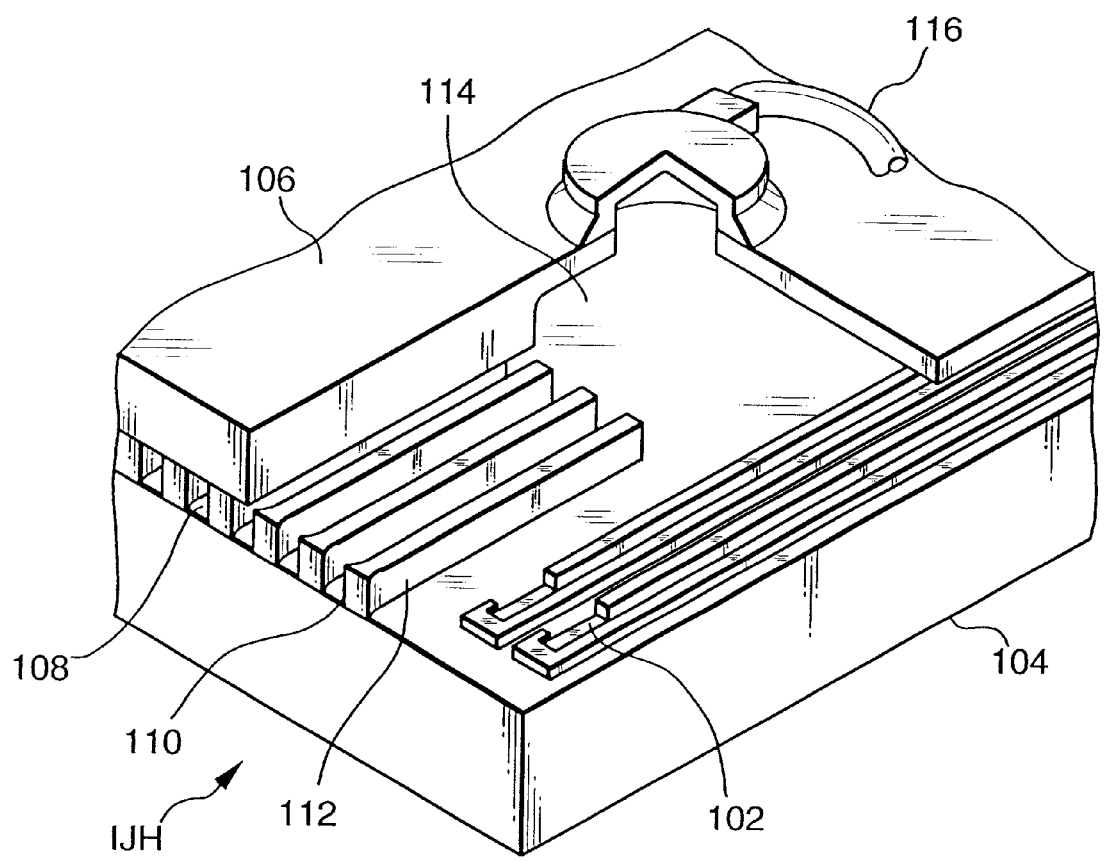
FIG. 3 is a perspective view showing the structure of an ink-jet head used for a color filter manufacturing apparatus.

FIG. 3 shows the structure of an ink-jet head IJH used in the color filter manufacturing apparatus 90. Referring to FIG. 1, in the head unit 55, three ink-jet heads IJH are arranged in correspondence with three colors, i.e., R, G, and B. Since these three heads have the same structure, FIG. 3 shows the structure of one of the three heads as a representative.

Referring to FIG. 3, the ink-jet head IJH mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 116. This ink is supplied from the ink chamber 114 to each fluid passage 110.

The heater board 104 and the ceiling plate 106 are positioned such that the position of each heater 102 coincides with that of a corresponding fluid passage 110, and are assembled into the state shown in FIG. 3. Although FIG. 3 shows only two heaters 102, the heater 102 is arranged in correspondence with each fluid passage 110. When a predetermined driving signal is supplied to the heater 102 in the assembled state shown in FIG. 3, an ink above the heater 102 is boiled to produce a bubble, and the ink is pushed and discharged from the discharging opening 108 upon volume expansion of the ink. Therefore, the size of a bubble can be adjusted by controlling a driving pulse applied to the heater 102, e.g., controlling the magnitude of power. That is, the volume of the ink discharged from each discharging opening can be arbitrarily controlled.

Figure 4:
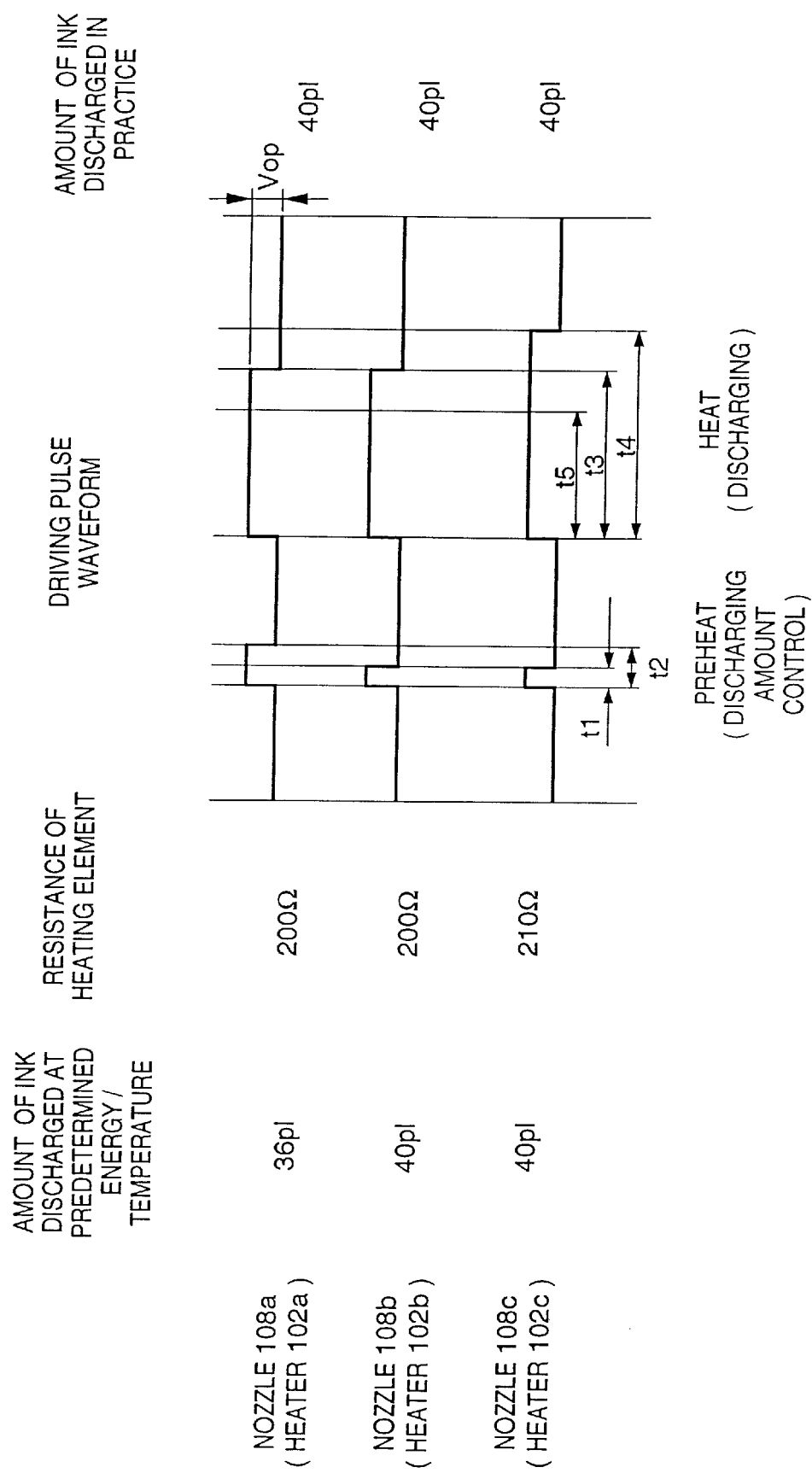
FIG. 4 is a timing chart showing the waveforms of voltages applied to the heaters of the ink-jet head.

FIG. 4 is a timing chart for explaining a method of controlling the amount of ink discharged by changing power supplied to each heater in this manner.

In this embodiment, two types of constant-voltage pulses are applied to each heater 102 to adjust the amount of ink discharged. The two pulses are a preheat pulse and a main heat pulse (to be simply referred to as a heat pulse hereinafter), as shown in FIG. 4. The preheat pulse is a pulse for heating an ink to a predetermined temperature before the ink is actually discharged. The pulse width of this pulse is set to be smaller than a minimum pulse width t5 required to discharge the ink. Therefore, the ink is not discharged by this preheat pulse. The preheat pulse is applied to each heater 102 to increase the initial temperature of the ink to a predetermined temperature in advance so as to always make the amount of ink discharged constant when a constant heat pulse is applied to the heater 102 afterward. In contrast to this, the temperature of the ink may be adjusted in advance by adjusting the width of a preheat pulse. In this case, for the same heat pulse, the amount of ink discharged can be changed. In addition, by heating ink before application of a heat pulse, the start time required to discharge the ink upon application of the heat pulse can be shortened to improve the responsibility.

The heat pulse is a pulse for actually discharging the ink. The pulse width of the heat pulse is set to be larger than the minimum pulse width t5 required to discharge the ink. Energy generated by each heater 102 is proportional to the width (application time) of a heat pulse. Therefore, variations in the characteristics of the heaters 102 can be adjusted by adjusting the width of each heat pulse.

Note that the amount of ink discharged can also be adjusted by adjusting the interval between a preheat pulse and a heat pulse to control the dispersed state of heat upon application of the preheat pulse.

As is apparent from the above description, the amount of ink discharged can be controlled both by adjusting the application time of a preheat pulse and by adjusting the interval between application of a preheat pulse and that of a heat pulse. Therefore, by adjusting the application time of a preheat pulse or the interval between application of a preheat pulse and that of a heat pulse as needed, the amount of ink discharged or the responsibility of discharging of the ink with respect to an applied pulse can be arbitrarily adjusted.

Such adjustment of the amount of ink discharged will be described in detail next.

Assume that an ink is discharged in different amounts from discharging openings (nozzles) 108a, 108b, and 108c upon application of the same voltage pulse, as shown in FIG. 4. More specifically, assume that when a voltage having a predetermined pulse width is applied at a predetermined temperature, the amount of ink discharged from the nozzle 108a is 36 pl (pico-liters); the amount of ink discharged from the nozzle 108b, 40 pl; and the amount of ink discharged from the nozzle 108c, 40 pl, and the resistance of heaters 102a and 102b corresponding to the nozzles 108a and 108b is 200 $\Omega$, and the resistance of a heater 102c corresponding to the nozzle 108c is 210 $\Omega$. Assume that the amounts of ink discharged from the nozzles 108a, 108b, and 108c are to be adjusted to 40 pl.

The widths of a preheat pulse and a heat pulse may be adjusted to adjust the amounts of ink discharged from the nozzles 108a, 108b, and 108c to the same amount. Various combinations of the widths of preheat pulses and heat pulses are conceivable. In this case, the amounts of energy generated by heat pulses are made equal for the three nozzles, and the amounts of ink discharged are adjusted by adjusting the widths of preheat pulses.

Since the heaters 102a and 102b for the nozzles 108a and 108b have the same resistance, i.e., 200 $\Omega$, the amounts of energy generated by heat pulses can be made equal by applying voltage pulses having the same width to the heaters 102a and 102b. In this case, the width of each voltage pulse is set to be t3 which is larger than the width t5. An ink is discharged in different amounts, i.e., 36 pl and 40 pl, from the nozzles 108a and 108b upon application of identical heat pulses. In order to increase the amount of ink discharged from the nozzle 108a, a preheat pulse having a width t2 larger than a width t1 of a preheat pulse applied to the heater 102b is applied to the heater 102a. With this operation, the amounts of ink discharged from the heaters 108a and 108b can be adjusted to 40 pl.

The heater 102c for the nozzle 108c has a resistance of 210 Ω, which is higher than the resistance of the two remaining heaters 102a and 102b. For this reason, in order to cause the heater 102c to generate the same amount of energy as that generated by the two remaining heaters, the width of a heat pulse must be set to be larger than that of the above heat pulse. In this case, therefore, the width of the heat pulse is set to be t4 which is larger than the width t3. Since the amounts of ink discharged from the nozzles 108b and 108c upon application of a predetermined pulse are the same, the width of a preheat pulse required is equal to that of a preheat pulse applied to the heater 102b. That is, a preheat pulse having the width t1 is applied to the heater 102c.

In the above manner, the same amount of ink can be discharged from the nozzles 108a, 108b, and 108c which discharge an ink in different amounts upon application of a predetermined pulse. In addition, the amounts of ink discharged may be intentionally made to differ from each other. Note that preheat pulses are used to reduce variations in the discharging operation of each nozzle.

FIGS. 5A to 5F show an example of the process of manufacturing a color filter.

In this embodiment, a glass substrate is generally used as a substrate 1. However, a substrate other than a glass substrate can be used as long as it has characteristics required for a liquid crystal color filter, e.g., good transparency and high mechanical strength.

Figure 5A:
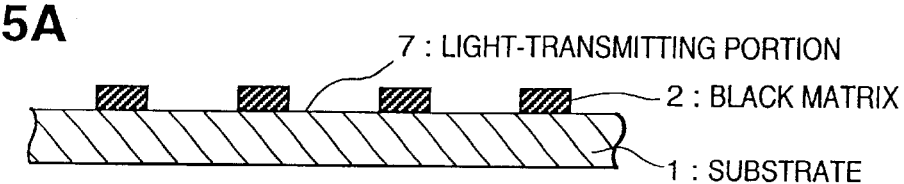
FIGS. 5A to 5F are sectional views showing the process of manufacturing a color filter.
Figure 5B:
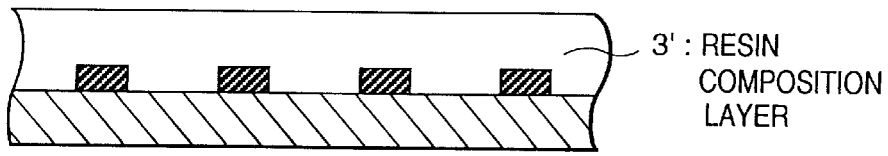

FIG. 5A shows the glass substrate 1 having a black matrix 2 constituted by light-transmitting portions 7 and light-shielding portions. First of all, the glass substrate 1, on which the black matrix 2 is formed, is coated with a resin composition which can be cured upon irradiation of light or irradiation of light and heating, and has ink receptivity. The resultant structure is prebaked, as needed, to form a resin layer 3' (FIG. 5B). The resin layer 3' can be formed by a coating method such as spin coating, roller coating, bar coating, spraying, or dipping. However, the present invention is not limited to any specific coating method.

Figure 5C:
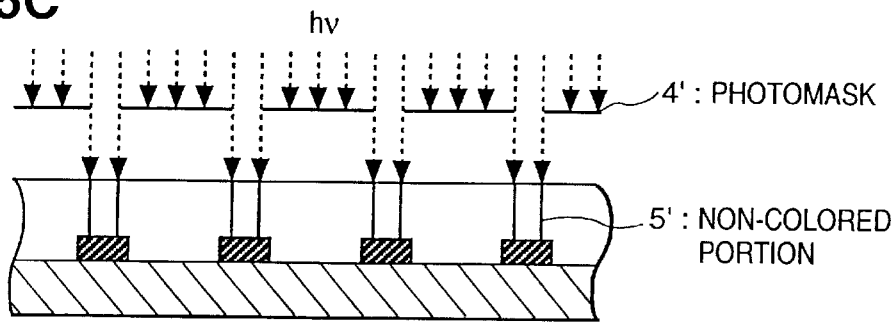
Figure 5D:
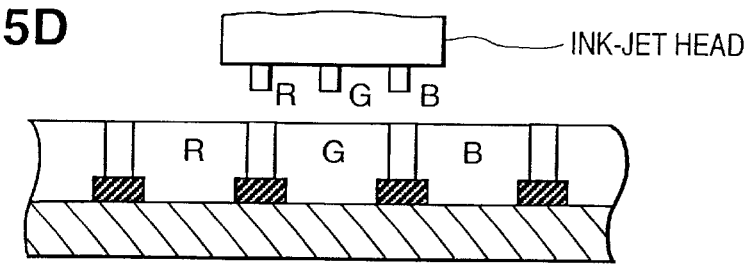
Figure 5E:
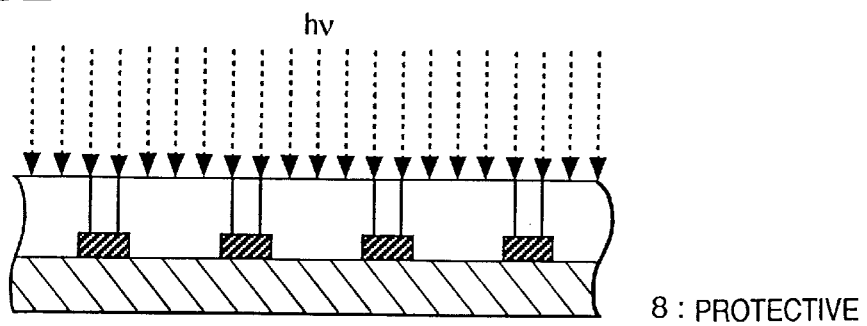

Subsequently, pattern exposure is performed in advance onto resin layer portions light-shielded by the black matrix 2 by using a photomask 4' to cure the exposed portions of the resin layer so as to form portions 5' (non-colored portions) which do not absorb an ink (FIG. 5C). Thereafter, the resin layer is colored in R, G, and B at once by using the ink-jet heads (FIG. 5D), and the inks are dried, as needed.

As the photomask 4' used when pattern exposure is performed, a mask having opening portions for curing the portions light-shielded by the black matrix is used. In this case, in order to prevent a color omission of the color material at a portion in contact with the black matrix, a relatively large amount of ink must be discharged. For this reason, a mask having opening portions each having a size smaller than the width of each light-shielding portion of the black matrix is preferably used.

As an ink to be used for a coloring operation, both dye and pigment inks can be used, and both liquid and solid inks can be used.

As a curable resin composition to be used in the present invention, any resin composition which has ink receptivity and can be cured by at least one of the following treatments: irradiation of light and a combination of irradiation of light and heating, can be used. As resins, acrylic resin, epoxy resin, and silicone resin are available. As cellulose derivatives, hydroxypropyl cellulose, hydroxy ethyl cellulose, methyl cellulose, carboxymethyl cellulose are available, and modified materials thereof are also available.

Optical initiators (crosslinkers) can also be used to crosslink these resins by irradiation of light or irradiation of light and heating. As optical initiators, dichromate, a bis-azide compound, a radical-based initiator, a cation-based initiator, an anion-based initiator, and the like can be used. Mixtures of these optical initiators and combinations of the initiators and sensitizers can also be used. In addition, an optical acid generating agent such as onium salt can be used as a crosslinker. In order to make a crosslinking reaction further progress, a heat treatment may be performed after irradiation of light.

Resin layers containing these compositions have excellent heat resistance, excellent water resistance, and the like, and are sufficiently resistant to high temperatures and cleaning in the subsequent steps.

As an ink-jet system used in the present invention, a bubble-jet type using an electrothermal converter as an energy generating element, a piezoelectric jet type using a piezoelectric element, or the like can be used. A coloring area and coloring pattern can be arbitrarily set.

This embodiment exemplifies the structure in which the black matrix is formed on the substrate. However, after a curable resin composition layer is formed or after coloring is performed, a black matrix may be formed on the resin layer without posing any problem. That is, the form of a black matrix is not limited to that in this embodiment. As a method of forming a black matrix, a method of forming a thin metal film on a substrate by sputtering or deposition, and patterning the film by a photolithographic process is preferably used. However, the present invention is not limited to this.

Figure 5F:
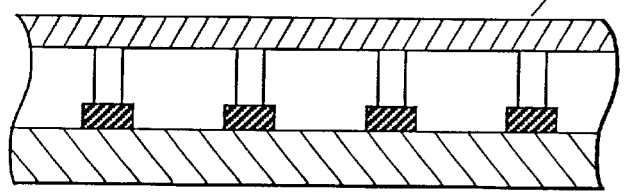

Subsequently, the curable resin composition is cured by performing only one of the following treatments: irradiation of light, a heat treatment, and a combination of irradiation of light and a heat treatment (FIG. 5E), and a protective layer 8 is formed, as needed (FIG. 5F). Note that reference symbol hv denotes the intensity of light. When a heat treatment is to be performed, heat is applied instead of hv. The protective layer 8 can be made of a second resin composition of a photo-setting type, thermosetting type, or photo-setting/thermosetting type. The resultant layer needs to have transparency upon formation of a color filter and be sufficiently resistant to the subsequent processes such as an ITO formation process and an aligning film formation process.

Although the resin composition is formed on the substrate in this embodiment, inks may be directly discharged onto the substrate in the following manner.

The ink-jet system is used to discharge R, G, and B inks onto the substrate to fill the light-transmitting portions of a black matrix which forms light-shielding portions. These R, G, and B patterns may be formed in the form of a so-called casting. Inks of the respective colors are preferably printed within the range in which they do not overlap on the black matrix.

As an ink to be used, both dye and pigment inks can be used as long as they can be set upon application of energy such as light and heat, and both liquid and solid inks can be used. The ink must contain a photo-setting component, a thermosetting component, or photo-setting/thermosetting component. As such components, various commercially available resins and curing agents can be used, and are not specifically limited as long as they do not cause problems such as retention in the ink. More specifically, acrylic resin, epoxy resin, melamine resin, and the like can be suitably used.

Figure 6:
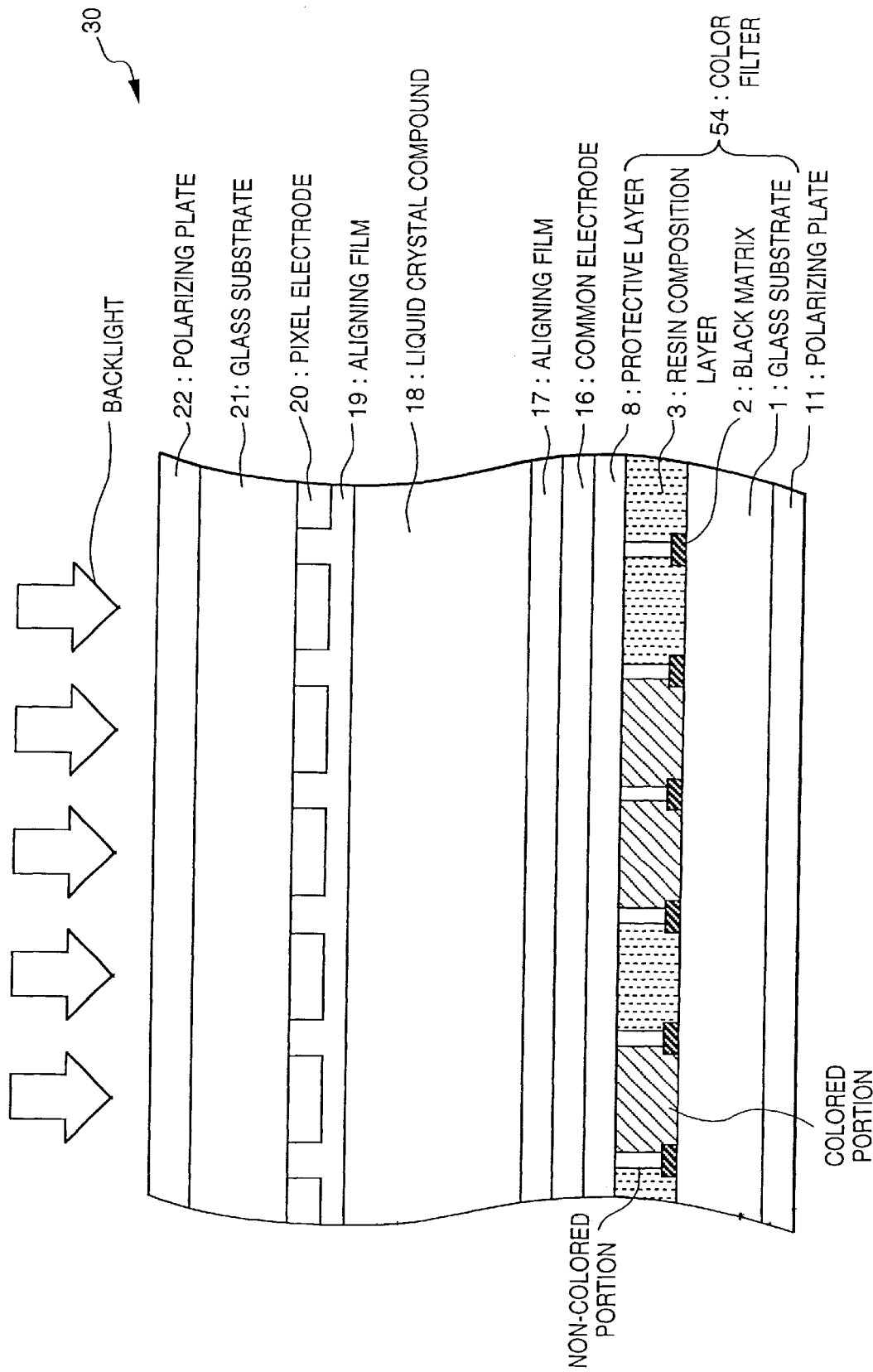
FIG. 6 is a sectional view showing the basic structure of a color liquid crystal display device incorporating a color filter according to an embodiment of the present invention.

FIG. 6 is a sectional view showing the basic structure of a color liquid crystal display device 30 incorporating the above color filter.

In general, a color liquid crystal panel is formed by joining the color filter substrate 1 to a counter substrate 21 and sealing a liquid crystal compound 18 therebetween. TFTs (Thin Film Transistors) (not shown) and transparent pixel electrodes 20 are formed on the inner surface of one substrate 21 of the liquid crystal panel in a matrix form. A color filter 54 is placed on the inner surface of the other substrate 1 such that the R, G, and B coloring materials are positioned to oppose the pixel electrodes. A transparent counter electrode (common electrode) 16 is formed on the entire surface of the color filter 54. The black matrix 2 is generally formed on the color filter substrate 1 side. Aligning films 19 are formed within the planes of the two substrates. By performing a rubbing process for the aligning films 19, the liquid crystal molecules can be aligned in a predetermined direction. Polarizing plates 11 and 22 are bonded to the outer surface of the respective glass substrates. The liquid crystal compound 18 is filled in the gap (about 2 to 5 $\mu$m) between these glass substrates. As a backlight, a combination of a fluorescent lamp (not shown) and a scattering plate (not shown) is generally used. A display operation is performed by causing the liquid crystal compound to serve as an optical shutter for changing the transmittance for light emitted from the backlight.

A case wherein the above liquid crystal display device is applied to an information processing apparatus will be described below with reference to FIGS. 7 to 9.

Figure 7:
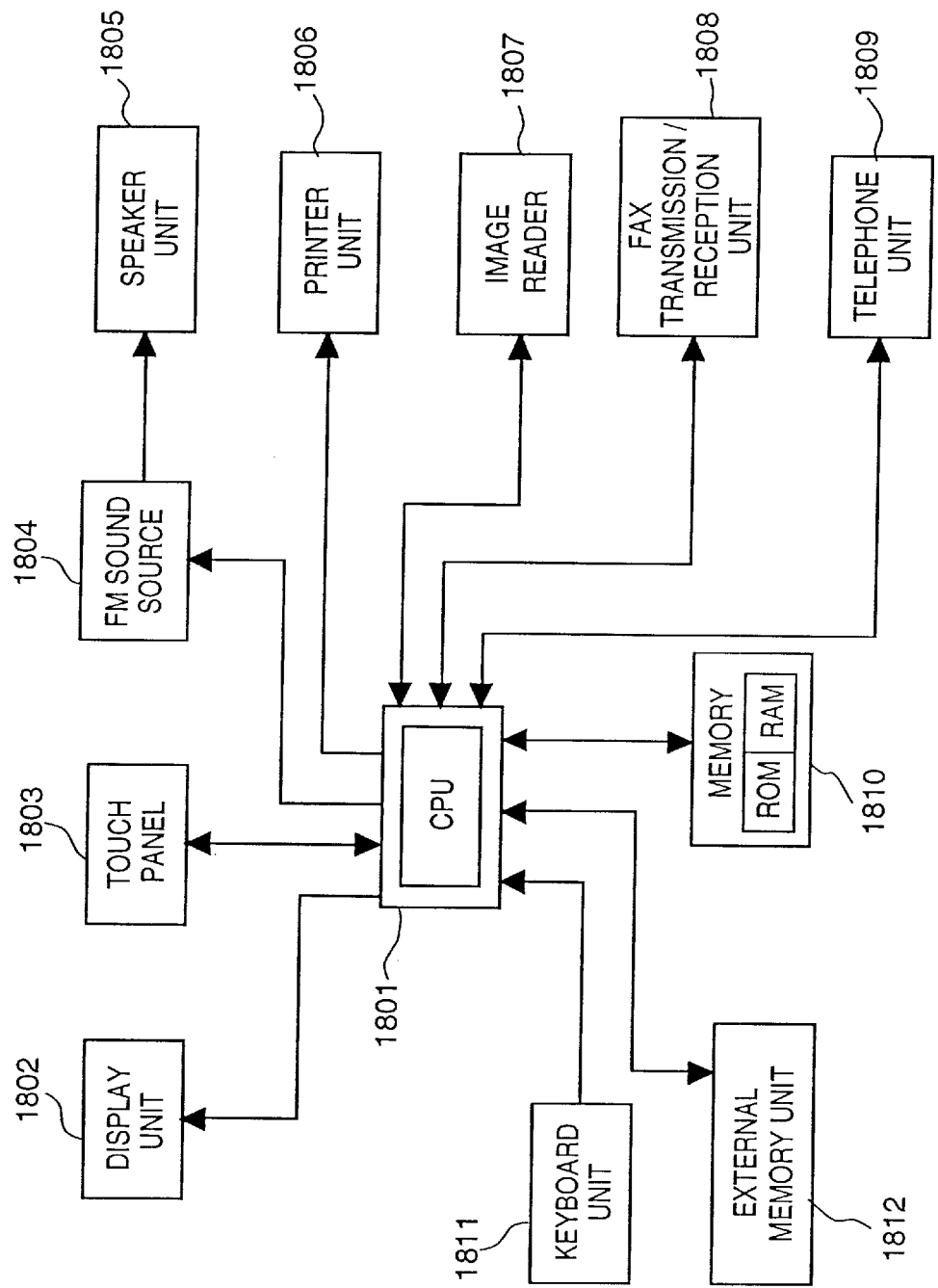
FIG. 7 is a block diagram showing an information processing apparatus using the liquid crystal display device.

FIG. 7 is a block diagram showing the schematic arrangement of an information processing apparatus serving as a wordprocessor, a personal computer, a facsimile apparatus, and a copying machine, to which the above liquid crystal display device is applied.

Referring to FIG. 7, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for the wordprocessor, the personal computer, the facsimile apparatus, and the copying machine.

Reference numeral 1807 denotes an image reader unit for photoelectrically reading original data. The image reader unit 1807 is arranged midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 8:
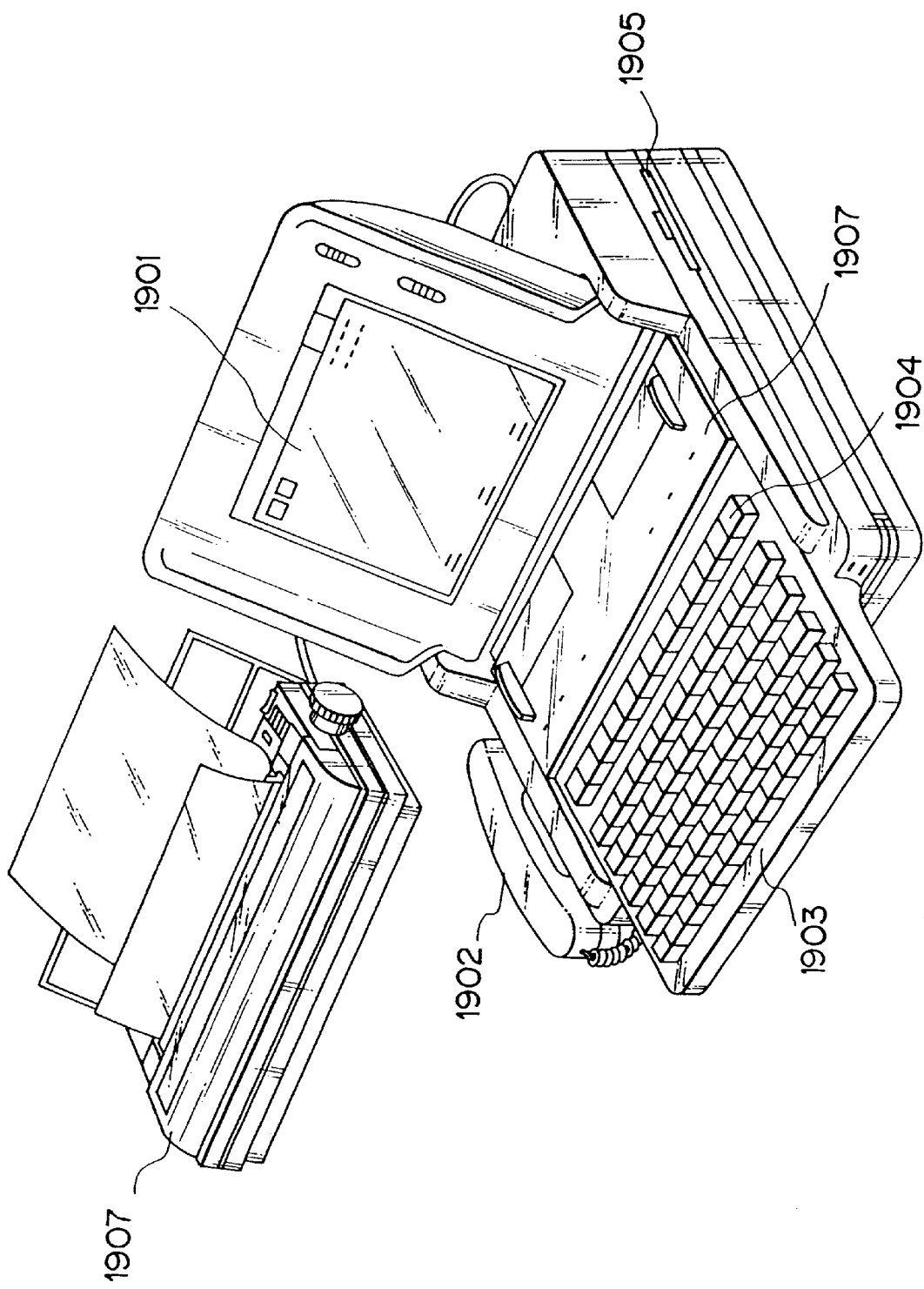
FIG. 8 is a perspective view showing the information processing apparatus using the liquid crystal display device.

FIG. 8 is a perspective view of the information processing apparatus in FIG. 7.

Referring to FIG. 8, reference numeral 1901 denotes a flat panel display using the above liquid crystal display device, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation or the like, received data is printed out by an ink-jet printer 1907.

When the above information processing apparatus is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus is to serve as the receiver of the facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus is to serve as the copying machine, an original is read by the image reader unit 1807, and the read original data is output, as an image to be copied, to the printer unit 1806 via the control unit 1801. Note that when the information processing apparatus is to serve as the receiver of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 9:
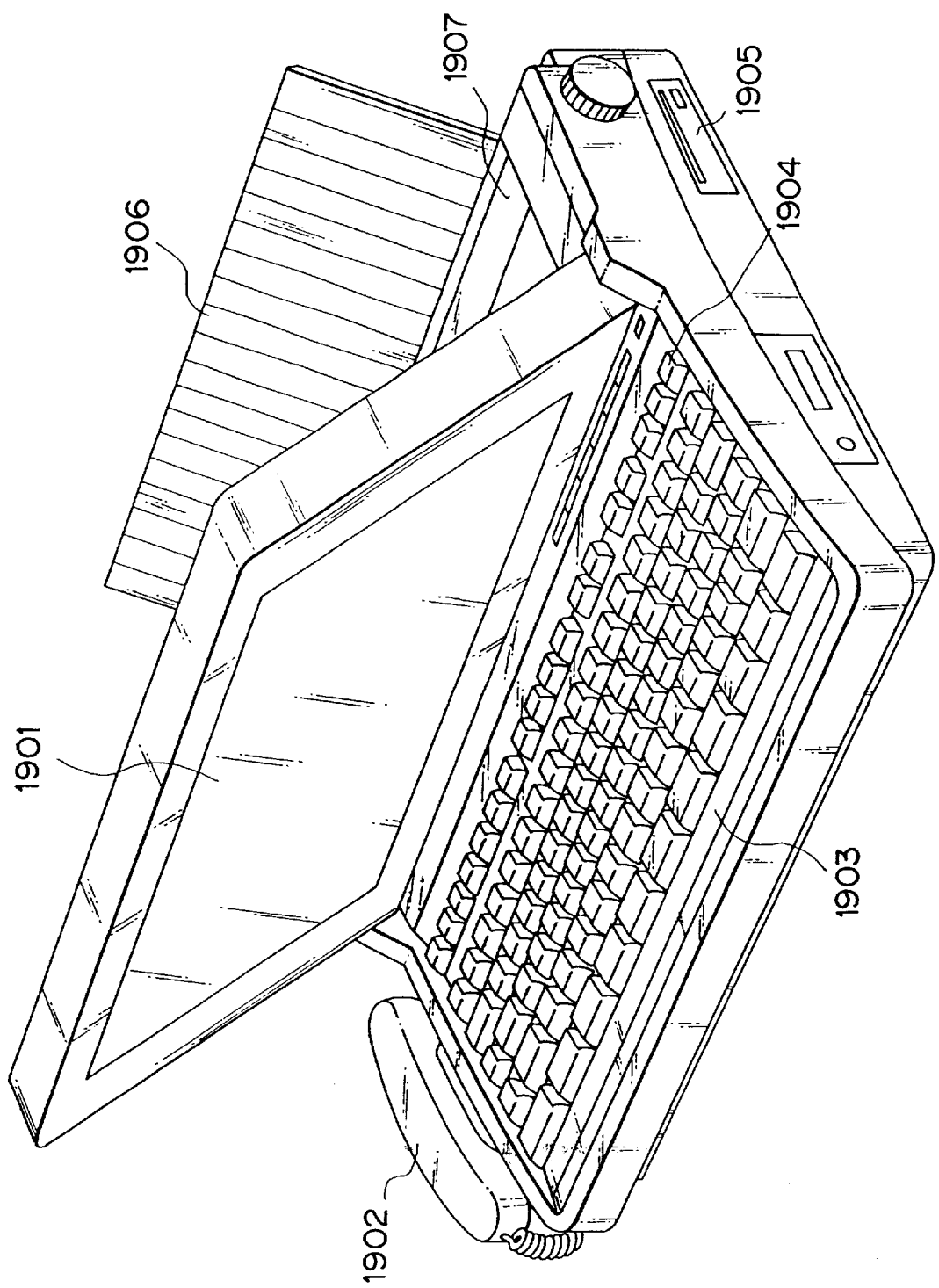
FIG. 9 is a perspective view showing the information processing apparatus using the liquid crystal display device.

Note that the above information processing apparatus may be designed as an integrated apparatus incorporating an ink-jet printer in the main body, as shown in FIG. 9. In this case, the portability of the apparatus can be improved. The same reference numerals in FIG. 9 denote parts having the same functions as those in FIG. 8.

Two typical methods of reducing density irregularity in the respective pixels of a color filter will be described next.

Figure 10:
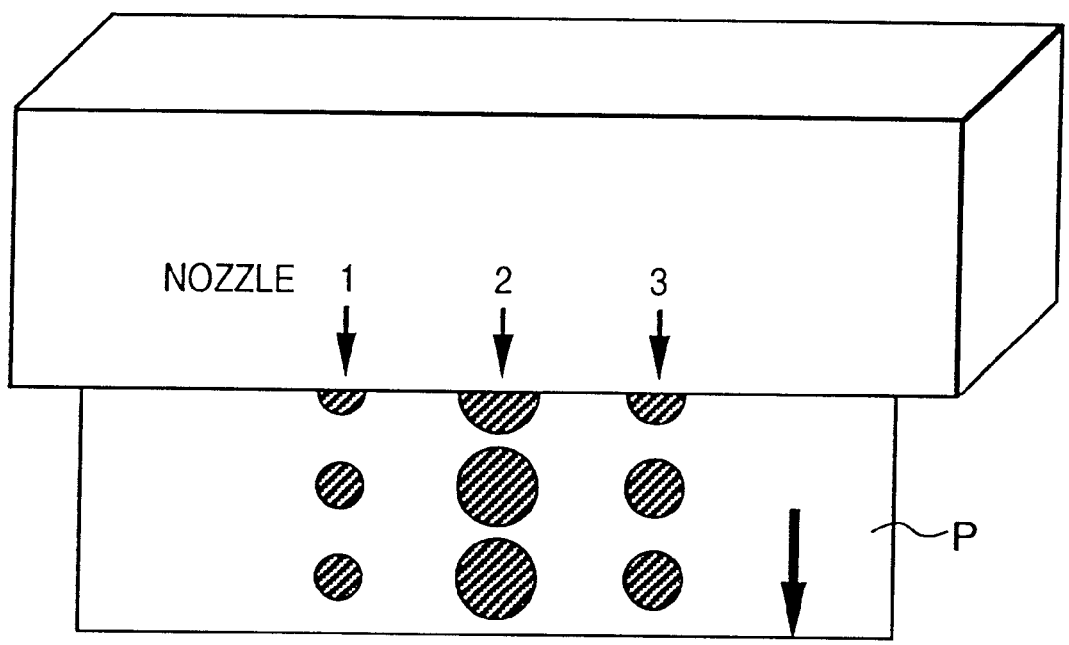
FIG. 10 is a view for explaining a method of correcting the differences between the amounts of ink discharged from the respective nozzles.
Figure 11:
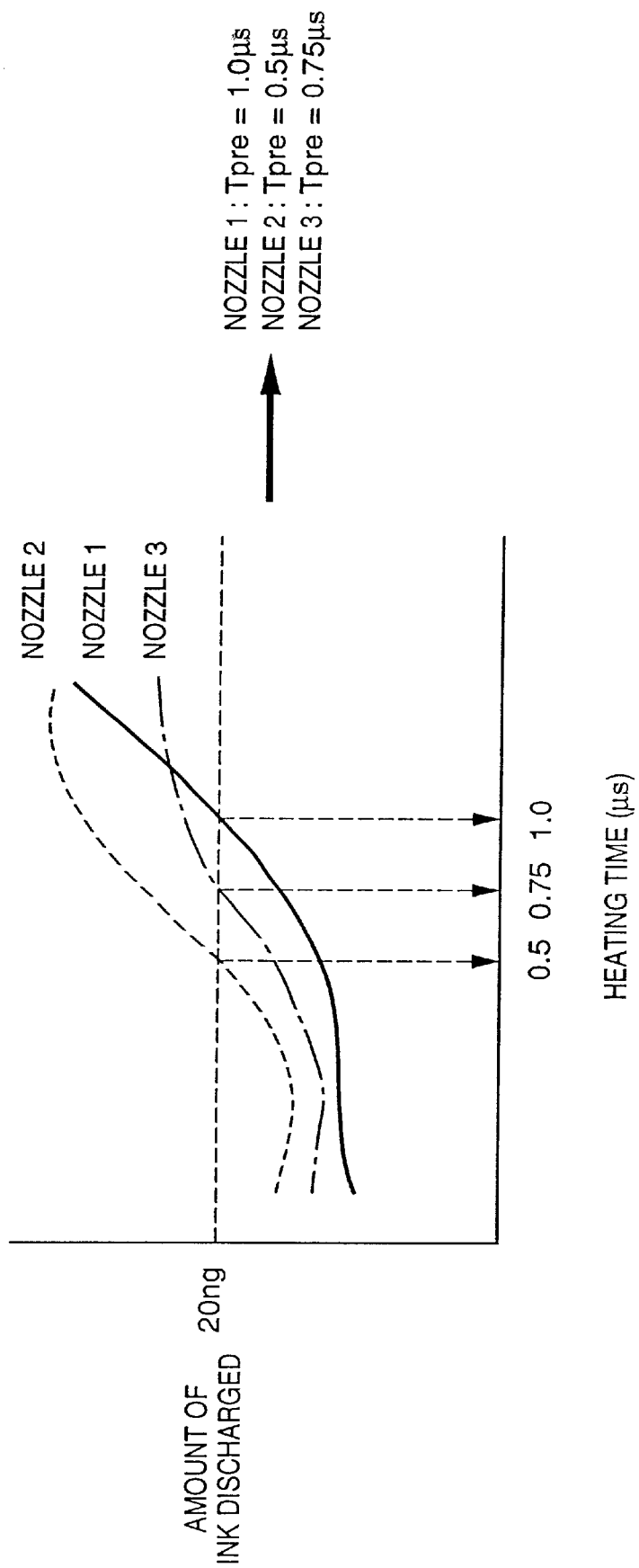
FIG. 11 is a graph for explaining the method of correcting the differences between the amounts of ink discharged from the respective nozzles.
Figure 12:
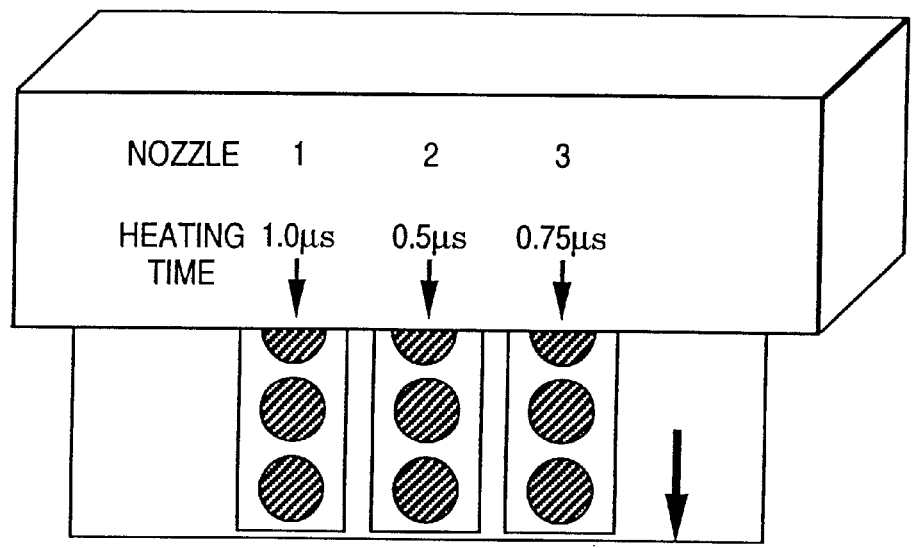
FIG. 12 is a view for explaining the method of correcting the differences between the amounts of ink discharged from the respective nozzles.

FIGS. 10 to 12 show a method (to be referred to as bit correction hereinafter) of correcting the differences between the amounts of ink discharged from the respective nozzles of the ink-jet head IJH having a plurality of ink discharging nozzles.

First of all, as shown in FIG. 10, inks are discharged from, for example, three nozzles 1, 2, and 3 of the ink-jet head IJH onto a predetermined substrate P. The sizes or densities of ink dots formed on the substrate P by the inks discharged from the respective nozzles are measured to measure the amounts of ink discharged from the respective nozzles. In this case, the width of a heat pulse (see FIG. 4) to be applied to each nozzle is kept constant, whereas the width of a preheat pulse (see FIG. 4) is changed, as described above. With this setting, curves, like those shown in FIG. 11, exhibiting relationships between the preheat pulse widths (represented by the heat time in FIG. 11) and ink discharging amounts can be obtained. As is obvious from FIG. 11, the widths of preheat pulses to be applied to the nozzles 1, 2, and 3 are 1.0 $\mu$s, 0.5 $\mu$s, and 0.75 $\mu$s, respectively. All the amounts of ink discharged from the respective nozzles can therefore be set to 20 ng as shown in FIG. 12 by applying the preheat pulses having these widths to the heaters of the respective nozzles. Correcting the amounts of ink discharged from the respective nozzles will be called bit correction. In this embodiment, for example, the width of a preheat pulse is changed in four levels to realize a correction width of about 30%. The correction resolution is 2 to 3%.

Figure 13:
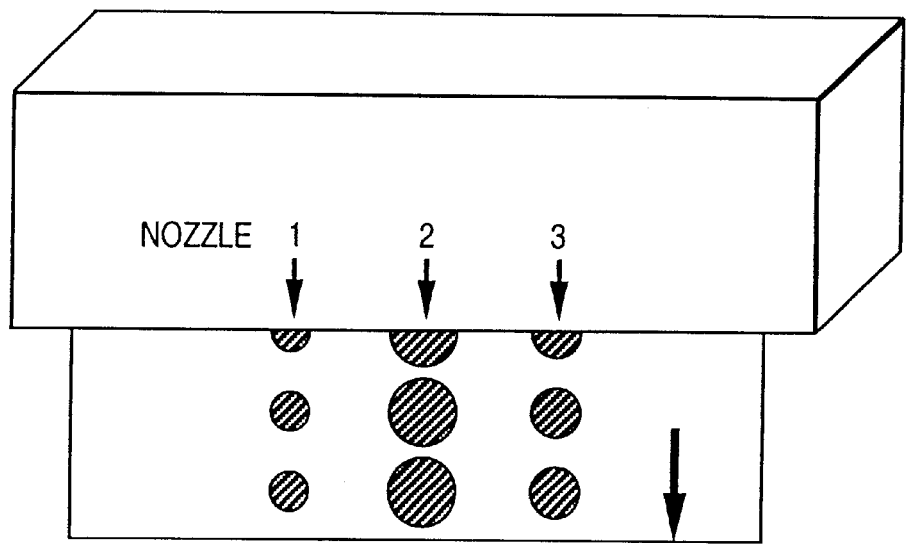
FIG. 13 is a view for explaining a method of changing an ink discharging density.
Figure 14:
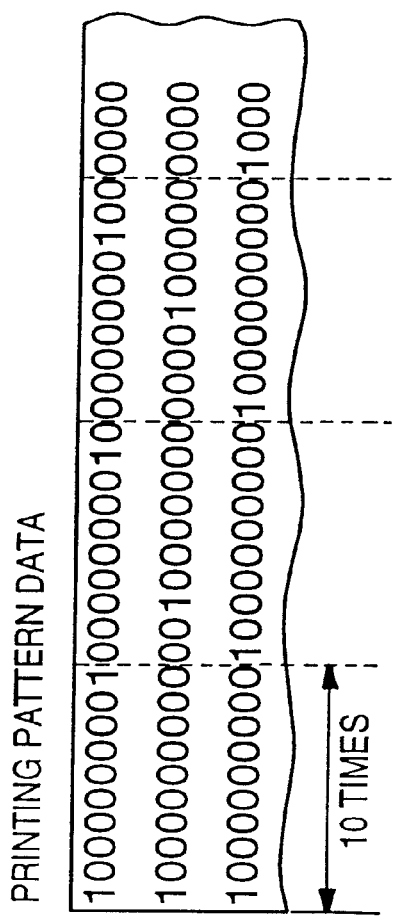
FIG. 14 is a view for explaining the method of changing an ink discharging density.
Figure 15:
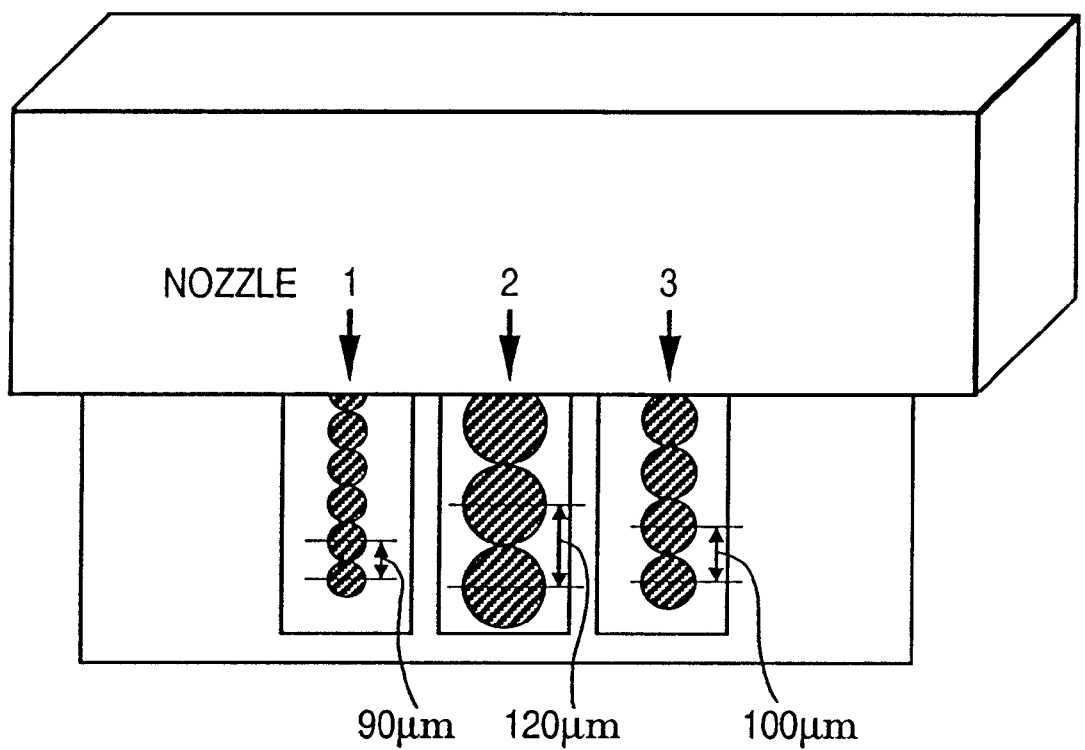
FIG. 15 is a view for explaining the method of changing an ink discharging density.

FIGS. 13 to 15 show a method (to be referred to as shading correction hereinafter) of correcting density irregularity in the scanning direction of the ink-jet head by adjusting the density of an ink discharged from each ink discharging nozzle.

Assume that the amounts of ink discharged from the nozzles 1 and 2 of the ink-jet head are −10% and +20%, respectively, relative to the amount of ink discharged from the nozzle 3, as shown in FIG. 13. In this case, while the ink-jet head IJH is scanned, a heat pulse is applied to the heater of the nozzle 1 once for every nine reference clocks, a heat pulse is applied to the heater of the nozzle 2 once for every 12 reference clocks, and a heat pulse is applied to the heater of the nozzle 3 once for every 10 reference clocks, as shown in FIG. 14. With this operation, inks are discharged from the respective nozzles different numbers of times in the scanning direction so the ink densities of the pixels of the color filter in the scanning direction can be made uniform, as shown in FIG. 15, thereby preventing density irregularity in the respective pixels. Correcting the ink discharging densities in the scanning direction in this manner is called shading correction.

In this embodiment, the head unit 55 is detachably mounted on the color filter manufacturing apparatus 90 such that the pivot angle of the unit can be adjusted within a horizontal plane, as described above. The R, G, and B ink-jet heads in the head unit 55 are adjusted by the adjusting device provided independently of the color filter manufacturing apparatus 90. The head unit 55 adjusted by this adjusting device is mounted on the color filter manufacturing apparatus 90, and only the pivot angle of the unit within a horizontal place is adjusted. With this arrangement, when the head unit 55 is mounted on the color filter manufacturing apparatus 90 and simple adjustment is performed, coloring of a color filter can be immediately started without performing other adjusting operations. When the head unit 55 is adjusted by the separate adjusting device, dust can be prevented, as compared with a case in which the head is adjusted while being mounted on the color filter manufacturing apparatus 90. In addition, since the color filter manufacturing apparatus 90 need not be stopped for the adjustment of the head, the availability of the apparatus can be improved.

Prior to a description of the adjusting device for adjusting the head unit 55, the structure of the head unit 55 will be described first.

The head unit 55 in this embodiment has a plurality of multi-nozzle type ink-jet heads, each having a plurality of nozzles, supported by the mount head 55a.

The mount head 55a has a mechanism for simultaneously changing the mounting angles of a plurality of heads, and a mechanism for separately adjusting the positions of the heads in the sub-scanning direction.

The pixels of a color filter are basically colored by the ink-jet method in the following manner. First of all, multi-nozzle heads, each having a plurality of nozzles at a predetermined pitch, and more specifically, nozzles corresponding to the pixel pitch, are used to perform coloring in the main scanning direction. The heads or the substrate is then moved in the sub-scanning direction, and coloring in the main scanning direction is repeated.

Since the nozzle pitch of each multi-nozzle type ink-jet head in this embodiment is smaller than the pixel pitch, coloring is performed by using every plurality of nozzles. If a pixel pitch does not coincide with a multiple of the nozzle pitch, the angle of each ink-jet head is changed from 90° with respect to the main scanning direction to match with the pixel pitch.

In this case, with a mechanism for simultaneously rotating a plurality of heads having the same nozzle pitch and a mechanism for finely adjusting the angle of each head, the pixel pitch and the pitch of nozzles, of each ink-jet head, which are to be used can be efficiently matched with each other.

In addition, with a mechanism for finely moving each ink-jet head in the sub-scanning direction, the nozzle positions of a plurality of heads can be set to desired pixel positions of the color filter.

Figure 16:
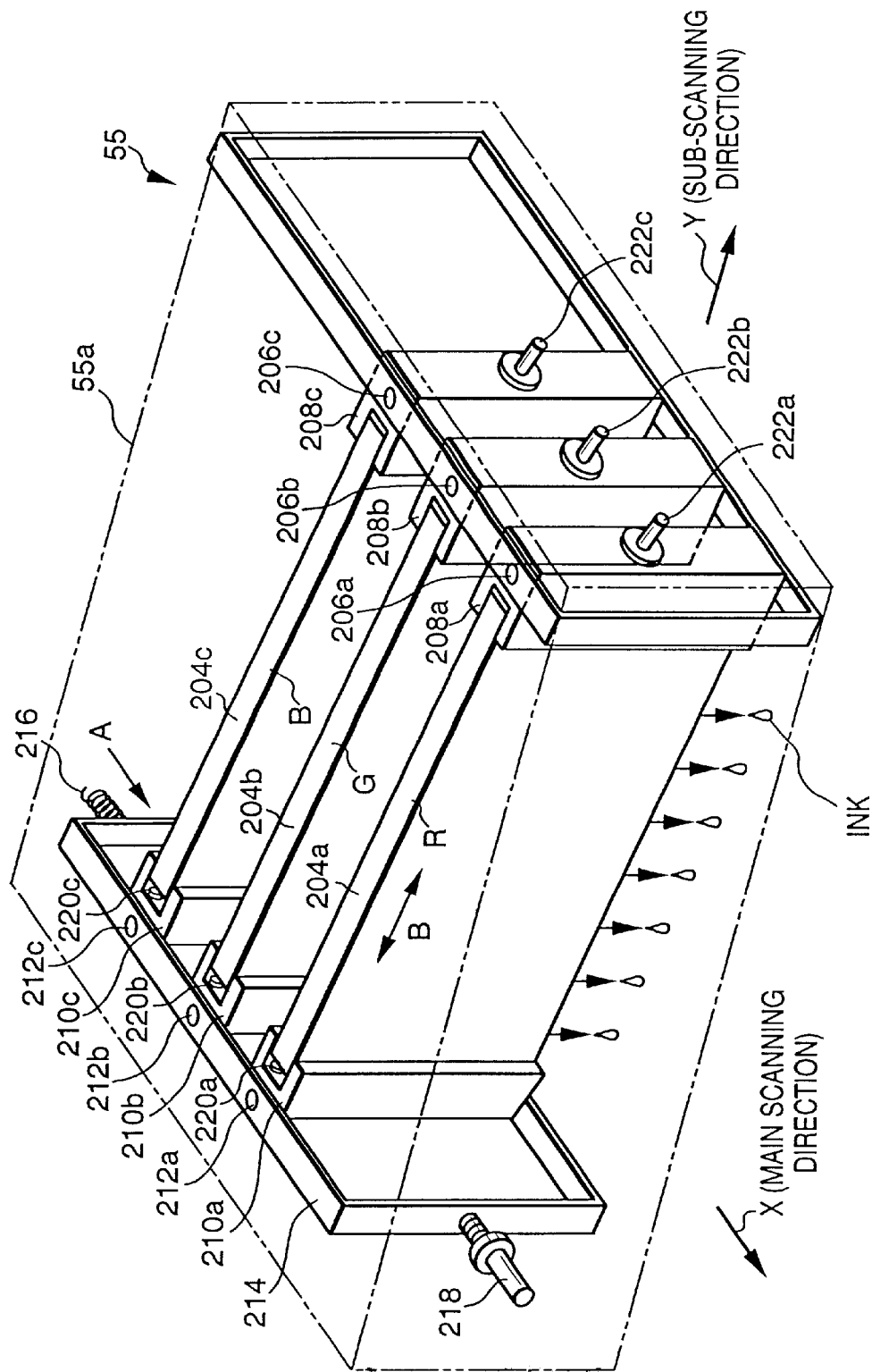
FIG. 16 is a perspective view showing the inner structure of a head mount.
Figure 17:
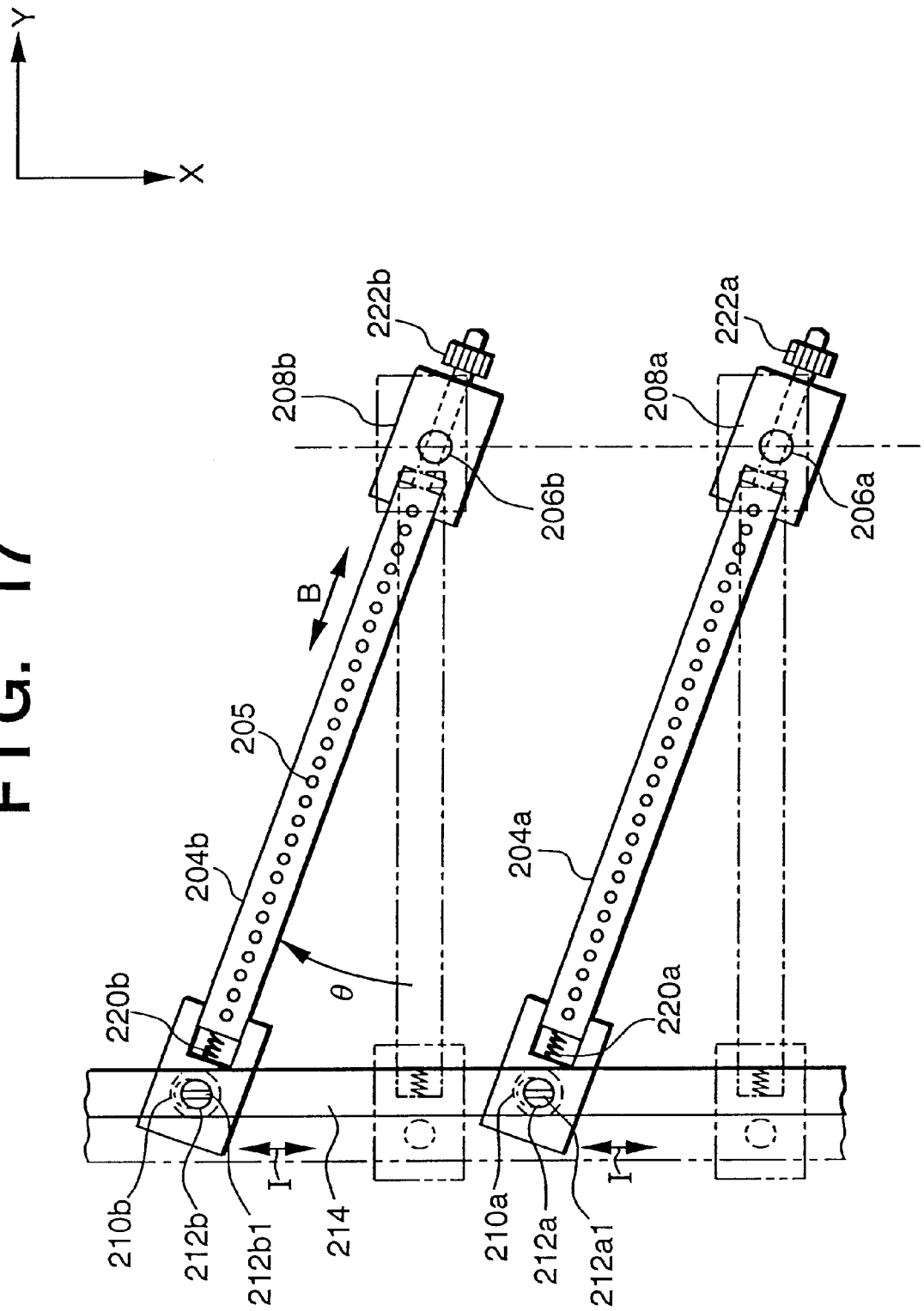
FIG. 17 is a plan view of the head mount in FIG. 16.

FIG. 16 is a perspective view showing the inner structure of the mount head 55a. FIG. 17 is a plan view of the mount head 55a in FIG. 16.

Referring to FIGS. 16 and 17, reference numerals 204a, 204b, and 204c denote multi-nozzle type ink-jet heads.

These three ink-jet heads, i.e., the R (red) head 204a, the G (green) head 204b, and the B (blue) head 204c, can be normally mounted on the mount head 55a. A plurality of nozzles 205 (the nozzles are mounted on the lower surfaces of the ink-jet heads and hence cannot be seen actually in FIG. 17, but are indicated by the solid lines for the sake of descriptive convenience) are arranged at the same pitch in the longitudinal direction of the heads. One end portion of each of the ink-jet heads 204a, 204b, and 204c is supported by a corresponding one of holders 208a, 208b, and 208c. These holders are supported to be pivotal about rotating shafts 206a, 206b, and 206c fixed to the mount head 55a within a horizontal plane with respect to the mount head 55a. The other end portion of each of the ink-jet heads 204a, 204b, and 204c is supported by a corresponding one of holders 210a, 210b, and 210c. These holders are supported to be pivotal about rotating shafts 212a, 212b, and 212c within a horizontal plane with respect to a slide member 214. The rotating shafts 212a, 212b, and 212c are eccentric shafts. By rotating slot portions 212a1, 212b1, and 212c1 (only the slot portion 212c1 is not shown) at the head portions of the rotating shafts 212a, 212b, and 212c, the holders 210a, 210b, and 210c can be finely moved in the direction indicated by an arrow I with respect to the slide member 214. With this structure, the pivot angles of the ink-jet heads 204a, 204b, and 204c can be finely adjusted independently of each other. The slide member 214 is supported to be movable in the X and Y directions with respect to the mount head 55a, and is biased by a spring 216 in the direction indicated by an arrow A. A micrometer screw 218 is set on the opposite side of the mount head 55a to the spring 216. By rotating the micrometer screw 218, the spring 216 is moved in the X direction. With this operation, the three ink-jet heads 204a, 204b, and 204c can be simultaneously inclined by an arbitrary angle θ with respect to the positions indicated by the dotted lines in FIG. 17 (the Y-axis), thereby adjusting the inclinations of the heads with respect to the scanning direction. By rotating the eccentric shafts 212a, 212b, and 212c, the inclination angles of the respective heads can be finely adjusted independently. In addition, compression springs 220a, 220b, and 220c are arranged in the holders 210a, 210b, and 210c to bias the ink-jet heads 204a, 204b, and 204c to the right in FIG. 17. Micrometer screws 222a, 222b, and 222c are set on the holders 208a, 208b, and 208c to oppose the compression springs 220a, 220b, and 220c. By rotating these micrometer screws, the positions of the respective ink-jet heads can be adjusted in the direction indicated by an arrow B (the sub-scanning direction).

If the mount head 55a is set on the adjusting device such that the main scanning direction X coincides with a straight line connecting the rotating shafts 206a, 206b, and 206c of the respective heads, adjustment is facilitated.

In actually adjusting the heads, the heads are simultaneously rotated about the head rotating shafts 206a, 206b, and 206c to adjust the angle θ of the respective heads so as to match the pitch of desired nozzles (nozzles used for coloring) with a pixel pitch. In addition, the slight differences between the relative angles of the respective heads are adjusted by rotating the eccentric shafts 212a, 212b, and 212c. In this case, each head is inclined by the angle θ that satisfies b=na·cos θ (n is a positive integer) where a is the nozzle pitch ($\mu$m), and b is the pixel pitch ($\mu$m). Thereafter, the micrometer screws 222a, 222b, and 222c are adjusted to match the positions of the nozzles with the positions of R, G, and B pixel patterns.

Figure 18:
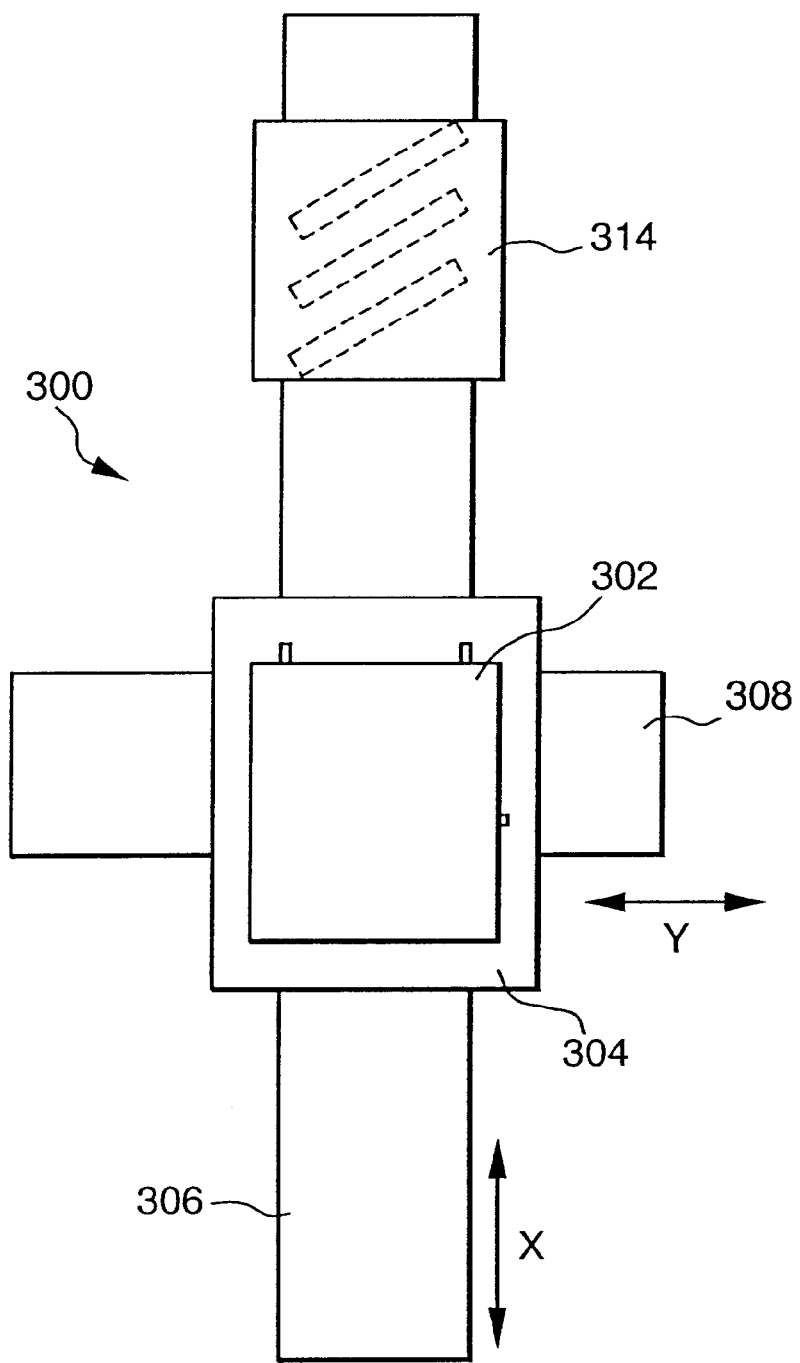
FIG. 18 is a plan view showing the structure of an adjusting device for adjusting a head unit.
Figure 19:
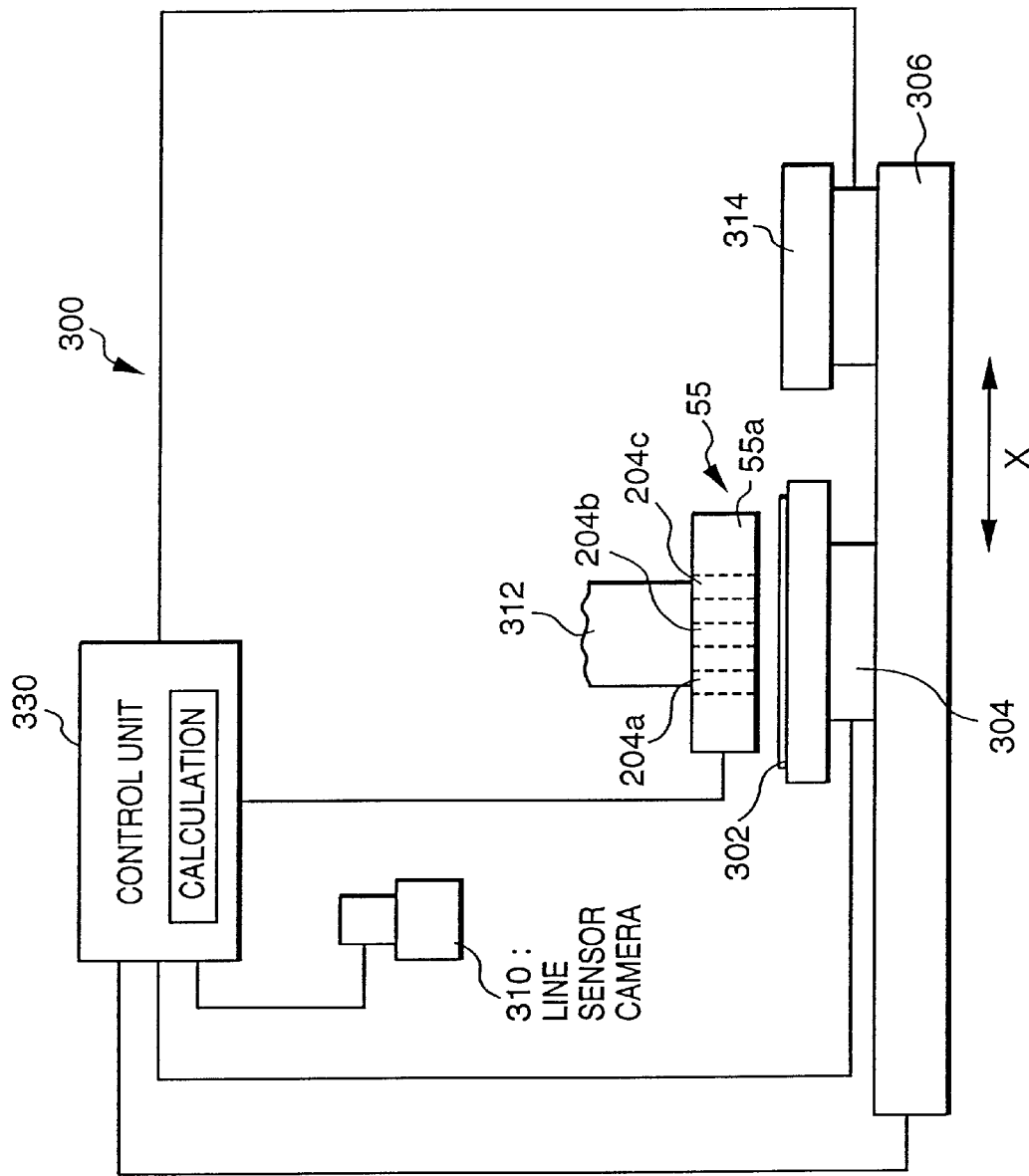
FIG. 19 is a side view showing the structure in FIG. 18 when viewed from the right side.

FIG. 18 is a plan view showing the structure of an adjusting device 300 for adjusting the head unit 55. FIG. 19 is a side view of the adjusting device 300 in FIG. 18 when viewed from the right side.

Referring to FIGS. 18 and 19, an X slide guide 306 extending in the X direction is mounted on a base (not shown). A Y slide guide 308 extending in the Y direction is supported on the X slide guide 306 to be slidable in the X direction. The Y slide guide 308 is slid/driven on the X slide guide 306 in the X direction by a driving mechanism (not shown). A table 304 is supported on the Y slide guide 308 to be slidable in the Y direction. A glass substrate 302 to which inks are discharged for head adjustment is placed on the table 304. The glass substrate 304 is slid/driven on the Y slide guide 308 in the Y direction by a driving mechanism (not shown). As a result, the table 304, i.e., the glass substrate 302, is moved/driven two-dimensionally in the X and Y directions with respect to the base (not shown).

The head unit 55 is placed above the table 304 while being mounted on a head support column 312 of the adjusting device 300, as shown in FIG. 19. A line sensor camera 310 for reading ink dots printed on the glass substrate 302 is placed on a side of the head unit 55.

A restoring unit 314 is placed on an extended line of the X slide guide 306. The restoring unit 314 restores the ink discharging nozzles of the ink-jet heads 204a, 204b, and 204c from discharge failures to normal states by sucking inks from the nozzles.

A procedure for adjusting the head unit 55 by using the adjusting device having the above structure will be described below.

Figure 20:
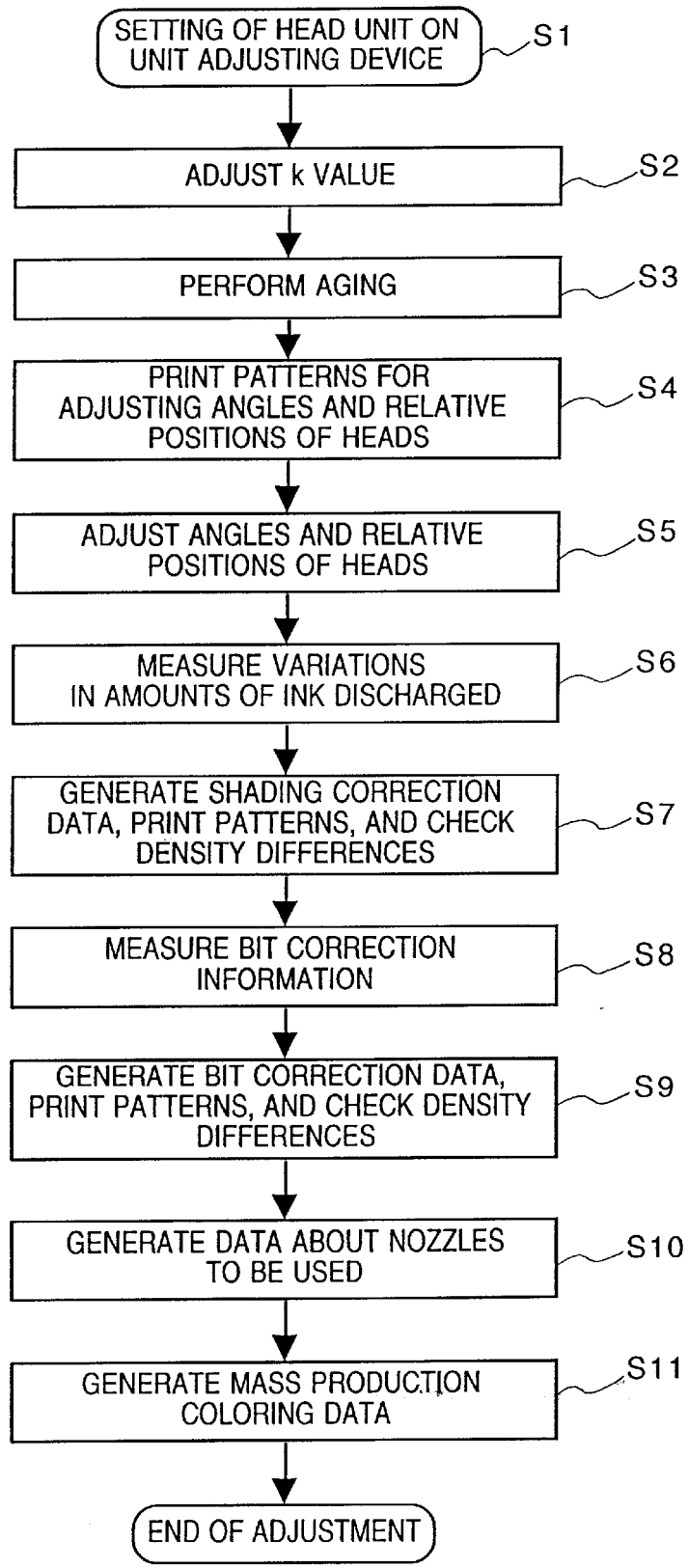
FIG. 20 is a flow chart showing an overall procedure for adjusting the head unit.

FIG. 20 is a flow chart showing the overall procedure for adjusting the head unit. The overall procedure for adjusting the head unit will be described with reference to this flow chart of FIG. 20. The respective steps will be described in detail later.

First of all, the ink-jet head unit 55 incorporating a plurality of heads each having undergone a screening test, precision adjustment, and the like is mounted on the restoring unit 314 head support column 312 of the adjusting device 300 (step S1).

Subsequently, drive voltages to be applied to the respective heads incorporated in the head unit are adjusted (K value adjustment). In this adjustment, a voltage $V_{op}$ in FIG. 4 is gradually increased to discharge ink so as to set each drive voltage to a constant multiple of a threshold voltage for starting a discharging operation. In this embodiment, the drive voltages were set to about 24 V to 26 V (step S2) although they differ depending on the heads.

Aging is performed for a predetermined period of time to eliminate the initial unstable region of discharging from each head. In this test, inks were discharged from all the nozzles $6 \times 10^6$ times (step S3).

Inks are discharged from the heads 204a, 204b, and 204c of the head unit 55 to print patterns, on the glass substrate 302, which are used for the angle and relative position adjustment of the respective heads (step S4). The patterns are read by a line sensor camera 310, and the angles and relative positions of the respective heads are adjusted on the basis of data obtained from the read patterns (step S5).

Inks are discharged from the respective heads to print patterns, on the glass substrate 302, which are used to detect the amounts of ink discharged from the respective nozzles of the heads, and the patterns are read by the line sensor camera 310 to detect the amounts of ink discharged from the respective nozzles on the basis of the densities of the read patterns (step S6).

If there are differences between the amounts of ink discharged from the respective nozzles, data about the densities of the inks discharged from the respective nozzles, i.e., data for the above shading correction, is generated to equalize the densities of the patterns printed in units of nozzles. Patterns are then printed after shading correction based on the generated shading correction data, and the density differences (corresponding to the total amounts of ink discharged per unit length in the scanning direction) of the printed patterns are checked (step S7).

Changes in the amounts of ink discharged from the respective nozzles with changes in the lengths of preheat pulses applied to the heaters of the respective nozzles (using the above bit correction method) are measured (step S8).

Data indicating the lengths of preheat pulses to be applied to the heaters of the respective nozzles so as to equalize the amounts of ink discharged from the respective nozzles is generated on the basis of the data about the amounts of ink discharged from the respective nozzles, obtained in step S6, and the data about changes in the amounts of ink discharged with changes in the lengths of preheat pulses, obtained in step S8. Patterns are printed after shading correction and bit correction based on the shading correction data generated in step S7 and the bit correction data generated in step S8, and the density differences (corresponding to the total amounts of ink discharged per unit length in the scanning direction) of the printed patterns are checked (step S9).

If there are density differences between the patterns printed in units of nozzles even after shading correction and bit correction in step S9, one pixel is colored by performing a scanning operation a plurality of number of times (to be called a multi-pass method hereinafter), and different nozzles are used for the respective scanning operations. When, for example, one pixel array is to be colored by three scanning operations, the first nozzle is used for the first scanning operation; the second nozzle, for the second scanning operation; and the third nozzle, for the third scanning operation. In this manner, different nozzles are used for the respective scanning operations. In this case, a simulation is performed to find which nozzles should be used in the first, second, and third scanning operations to minimize the density differences between the respective pixel arrays. In step S10, this simulation is performed to generate data indicating the specific ordinal numbers of nozzles to be used in the respective scanning operations. As methods of adjusting the amounts of ink discharged, two types of methods, i.e., shading correction and bit correction, are described. However, it suffices if one of the methods is performed. In many cases, the amounts of ink discharged can be satisfactorily corrected by shading correction alone. That is, bit correction is not essential (steps S8 and S9 in FIG. 20).

Finally, mass production data that specifies the specific nozzles to be used and the specific ink discharging patterns in actually coloring a color filter is generated on the basis of the data obtained in steps S7 to S10 (step S11). In addition, mass production data can be generated without performing bit correction, as described above, with heat pulses applied to the heaters of the respective nozzles being made uniform.

Note that the above simulation calculation and control on head adjustment are performed by a control unit 330.

The head unit 55 is adjusted in the above manner.

A detailed operating procedure in each step in the flow chart of FIG. 20 will be described next.

Figure 21:
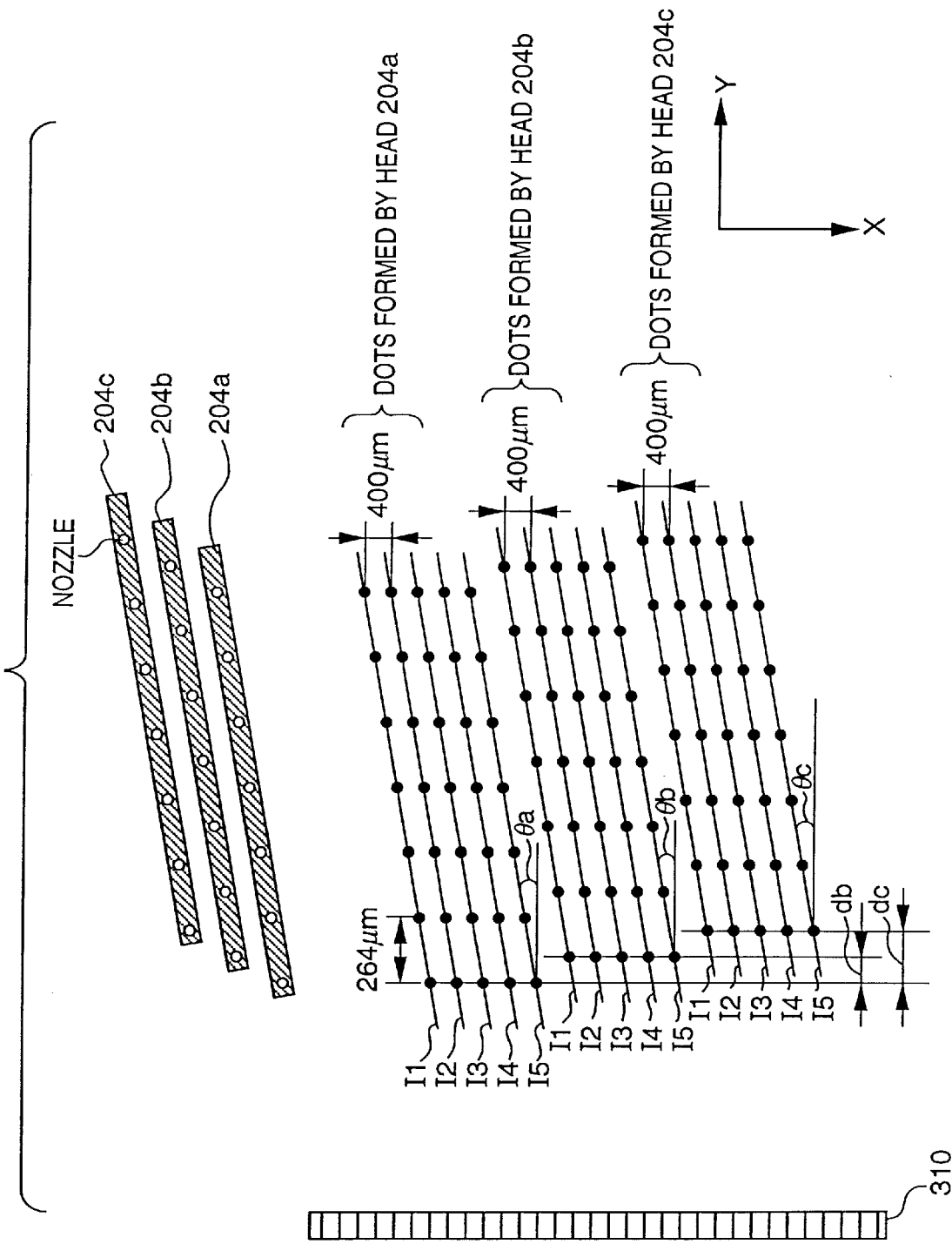
FIG. 21 is a view showing printed patterns used for adjusting the angles and relative positions of heads.

In step S4 in FIG. 20, first of all, the micrometer screw 218 of the head unit 55 is rotated to incline the R, G, and B heads 204a, 204b, and 204c such that the nozzle pitch almost coincides with the pixel pitch of the color filter. In this embodiment, for example, the pitch of the pixel arrays is 264 µm. The X slide guide 306 is then driven to move the table 304 in the X direction, and the head unit 55 is scanned in the X direction relative to the glass substrate 302. Meanwhile, for example, ink dots are printed, five at a time, on the glass substrate 302 at a pitch of 400 µm in the scanning direction by using the respective nozzles of each of the heads 204a, 204b, and 204c. FIG. 21 shows the resultant printed patterns.

Subsequently, the printed patterns are read by the line sensor camera 310 while the Y slide guide 308 is driven to move the table 304 in the Y direction, and the line sensor camera 310 is scanned in the Y direction relative to the glass substrate 302. The read printed patterns are subjected to image processing to obtain the center-of-gravity positions of the respective ink dots. Straight lines $I_1$ to $I_5$ that almost pass through the centers of gravity are obtained by least squares approximation. Angles θ1 to θ5 defined by the straight lines $I_1$ to $I_5$ and the Y-axis are obtained. The averages of these angles are then obtained as θa, θb, and θc defined by the heads 204a, 204b, and 204c and the Y-axis. In addition, relative distances db and dc between the nozzles of the respective heads in the Y direction are obtained from straight lines passing through the centers of gravity of dots arranged in the X direction.

In step S5, the eccentric shafts 212a, 212b, and 212c for finely adjusting the angles of the respective heads are rotated to perform fine adjustment such that the angles θa, θb, and θc obtained in step S4 are set to desired angles. In addition, the micrometer screws 222a, 222b, and 222c for finely adjusting the respective heads in the sub-scanning direction are rotated to finely adjust the positions of the respective heads such that the relative distances db and dc between the respective heads in the Y direction are set to desired distances. With the above operations, the angle adjustment and position adjustment of the respective heads are complete.

Figure 22:
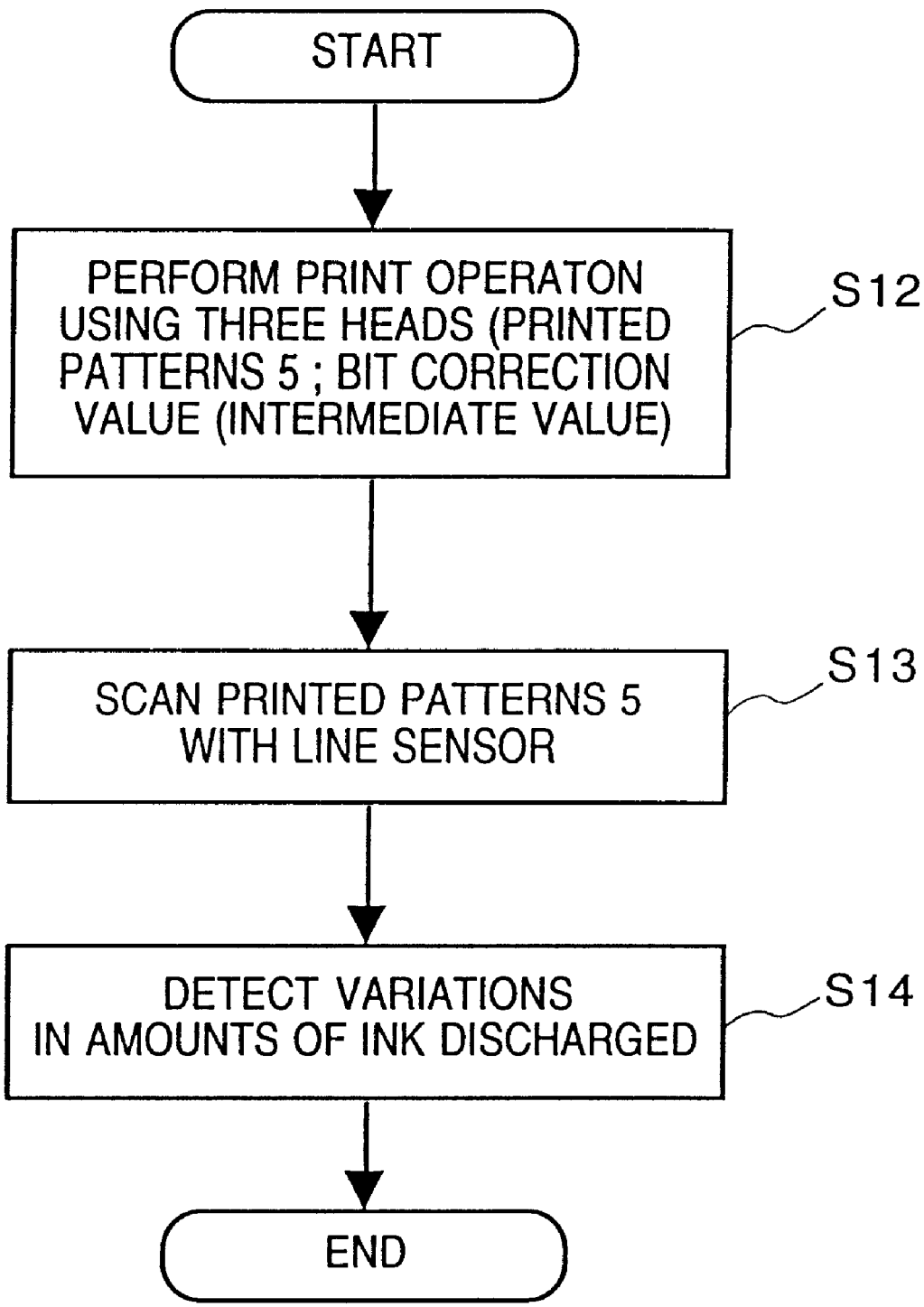
FIG. 22 is a flow chart showing a procedure for detecting variations in the amounts of ink discharged from the respective nozzles of the heads.

FIG. 22 is a flow chart showing the detailed contents of a procedure for measuring variations in the amounts of ink discharged from the respective nozzles (step S6) in the flow chart of FIG. 20.

Figure 23:
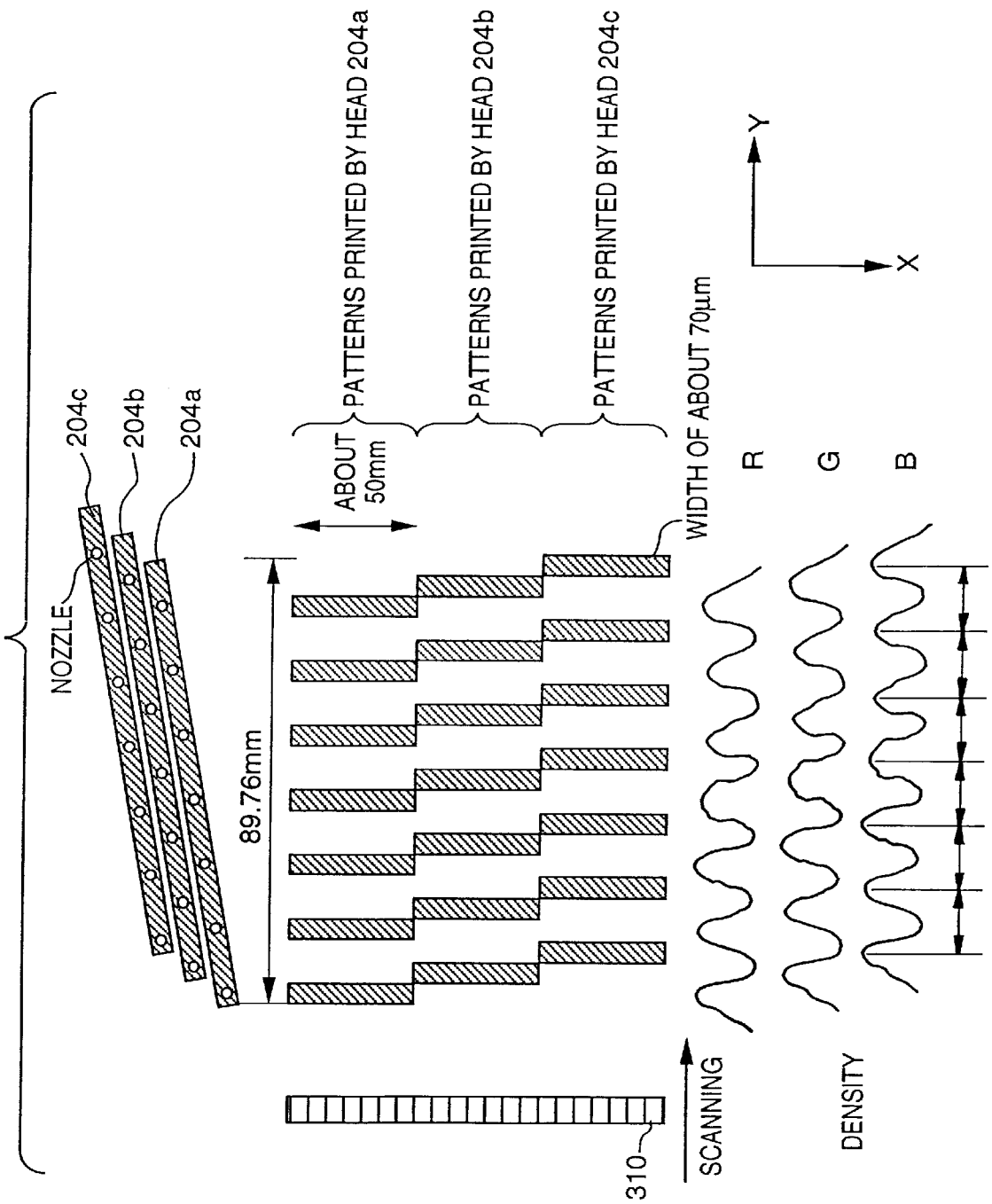
FIG. 23 is a view showing printed patterns used for detecting variations in the amounts of ink discharged from the heads.

First of all, inks are discharged from the nozzles of the respective heads while the head unit 55 is scanned in the X direction relative to the glass substrate 302, thereby printing line patterns each having a length of about 50 mm, as shown in FIG. 23. In this case, preheat and heat pulses having the same patterns are applied to the heaters of the respective nozzles, and bit correction is performed at an intermediate point (bit correction value "8") (step S12).

Subsequently, the densities of the respective line patterns printed in step S10 are measured while the line sensor camera 310 is scanned in the Y direction relative to the glass substrate 302 (step S13).

The amounts of ink discharged from the respective nozzles are obtained from the densities of the respective line patterns which are obtained in step S13 (step S14). With the above operation, data about variations in the amounts of ink discharged from the respective nozzles can be obtained.

A method of obtaining the amounts of ink discharged from the densities of line patterns will be described in detail below.

First of all, the densities of printed line patterns like those in FIG. 23 are measured by the line sensor camera 310. In this case, according to this embodiment, since each line pattern has a width of about 70 µm, the integral value of densities within the range of +40 µm from the center-of-gravity position of each line pattern in the Y direction is measured.

A calibration curve as a reference in measuring the amount of ink discharged from an arbitrary nozzle of an ink-jet head per discharging operation under arbitrary conditions is obtained. The amount of ink discharged from a nozzle per discharging operation generally indicates the amount of one ink droplet. However, since an ink may not become a droplet, the expression "the amount of ink discharged per discharging operation" is used instead of "the amount of one ink droplet".

First of all, the amounts of ink discharged from at least two nozzles per discharging operation, of a plurality of nozzles of each ink-jet head to be subject to measurement, which discharge inks in amounts as different as possible under predetermined conditions are obtained in advance by a gravimetric method or an absorbance method.

In this embodiment, the amounts of ink discharged from four nozzles, per discharging operation, which exhibited different discharging amounts under the predetermined conditions were obtained in advance by the gravimetric method.

Subsequently, inks are discharged from the four nozzles, whose discharging amounts per discharging operation have been obtained in this manner, under the same conditions as those set when the discharging amounts have been obtained. The densities of the ink dots formed on the glass substrate 302 by these inks are measured. With this measurement, the amounts of ink discharged from the four nozzles and the densities of the ink dots formed by the inks are obtained in one-to-one correspondence. Note that the density data of the ink dots formed by the four nozzles were obtained by sampling 50 printed dots and calculating the average values of the sampled values. In this case, the standard deviations of the density data were within 5% with respect to the average values.

Figure 24:
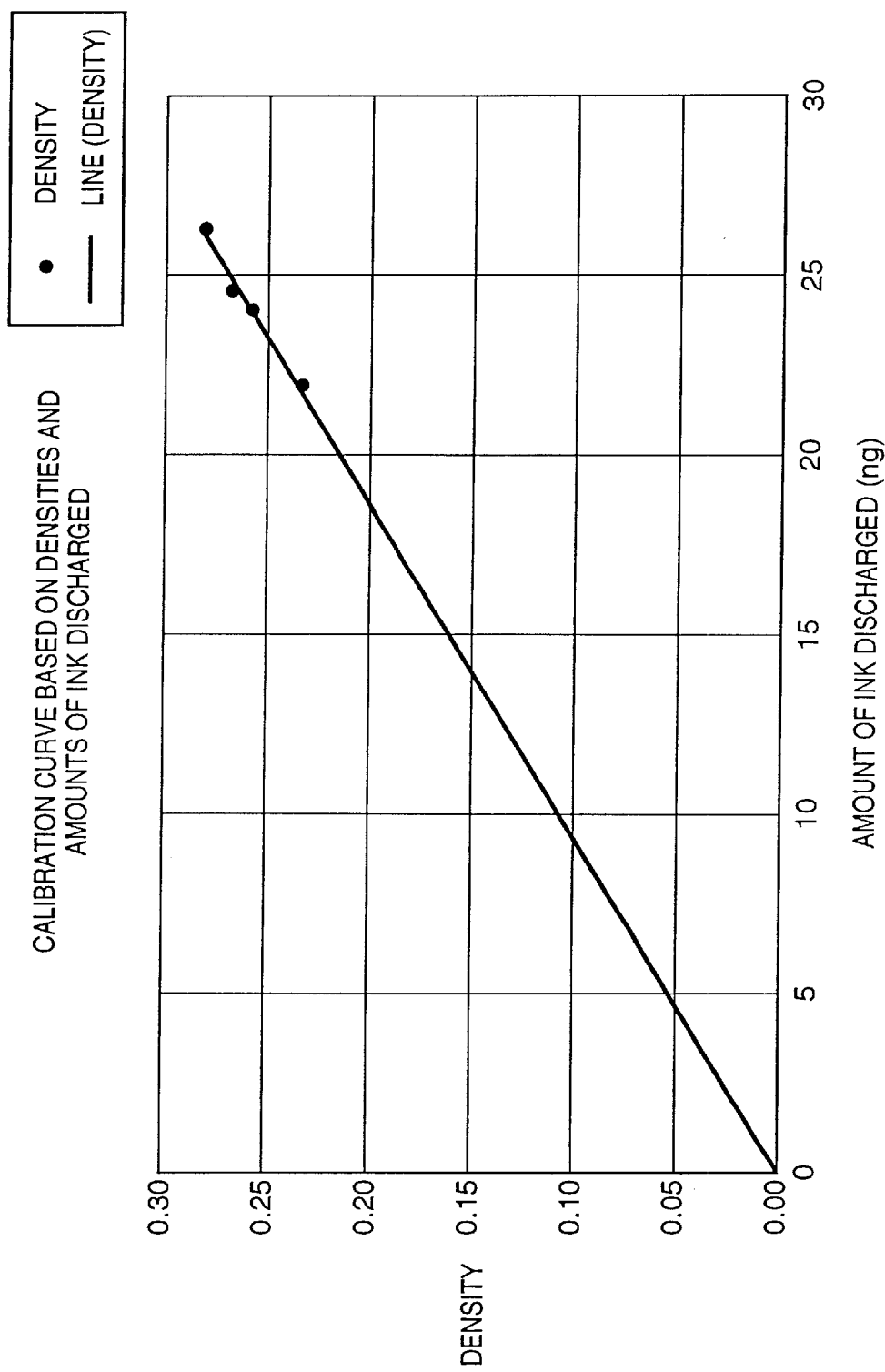
FIG. 24 is a graph showing the relationship between the densities of ink dots and the amounts of ink discharged.

FIG. 24 is a graph showing the relationship between the amounts of ink discharged from the four nozzles per discharging operation and the densities of the ink dots formed on the glass substrate 302 by the inks. Referring to FIG. 24, the bullets are points indicating the amounts of ink discharged from the four nozzles and the densities of the ink dots. As is obvious from this graph, the four points are present almost on a straight line. If, therefore, a straight line passing through the four points is drawn, the density of an ink dot corresponding to an arbitrary discharging amount as a point on this straight line can be uniquely obtained. This straight line will be referred to as a calibration curve.

This calibration curve is expressed by a straight line. A calibration curve can therefore be obtained by plotting at least two points on a graph. That is, a calibration curve can be obtained by using at least two nozzles instead of using the four nozzles as in the above case. In this embodiment, however, since ink discharging amount data obtained by the gravimetric method or the absorbance method is used to obtain a calibration curve, the precision of each measuring method directly affects the precision of discharging amount measurement in this embodiment. For this reason, a calibration curve is preferably obtained by using three or more nozzles. In addition, as is obvious, a new calibration curve must be obtained every time an ink to be used is changed.

Subsequently, on the basis of the density of a line pattern, which has already been obtained, and the above calibration curve, the amount of ink discharged from one nozzle, per discharging operation, which corresponds to the density of the line pattern is obtained. The ink discharging amount to be obtained in this step is the amount of ink discharged from one nozzle per discharging operation, but is not the amount of a plurality of inks like those forming a line pattern.

However, the present inventors have experimentally confirmed that the amount of ink discharged per discharging operation can be obtained by using the density of a line pattern with little influence on the precision in measuring the discharging amount.

In the above manner, the amount of ink discharged from each nozzle of each of the heads 204a, 204b, and 204c per discharging operation is obtained, and variations in the amounts of ink discharged from the respective nozzles can be measured.

If there are density differences between the respective line patterns, the above shading correction is performed in step S7 in FIG. 20 to change the ink discharging densities in units of nozzles, thereby eliminating the density irregularity. Data indicating how to change the densities of inks discharged from the respective nozzles is generated on the basis of the variations in the amounts of ink discharged from the respective nozzles. These ink discharging densities are determined such that the total amounts of inks landing per unit length in the scanning direction (X direction) become uniform for the respective nozzles. Consider a nozzle whose discharging amount per discharging operation is small. In this case, the ink discharging density in the scanning direction is increased. As to a nozzle whose discharging amount per discharging operation is larger, the ink discharging density in the scanning direction is decreased. Shading correction is performed on the basis of the data obtained in this manner, and line patterns like those in FIG. 23 are printed on the glass substrate 302. The densities of the line patterns are detected again by the line sensor camera 310.

If further correction based on these detected densities is required, bit correction is performed.

Figure 25:
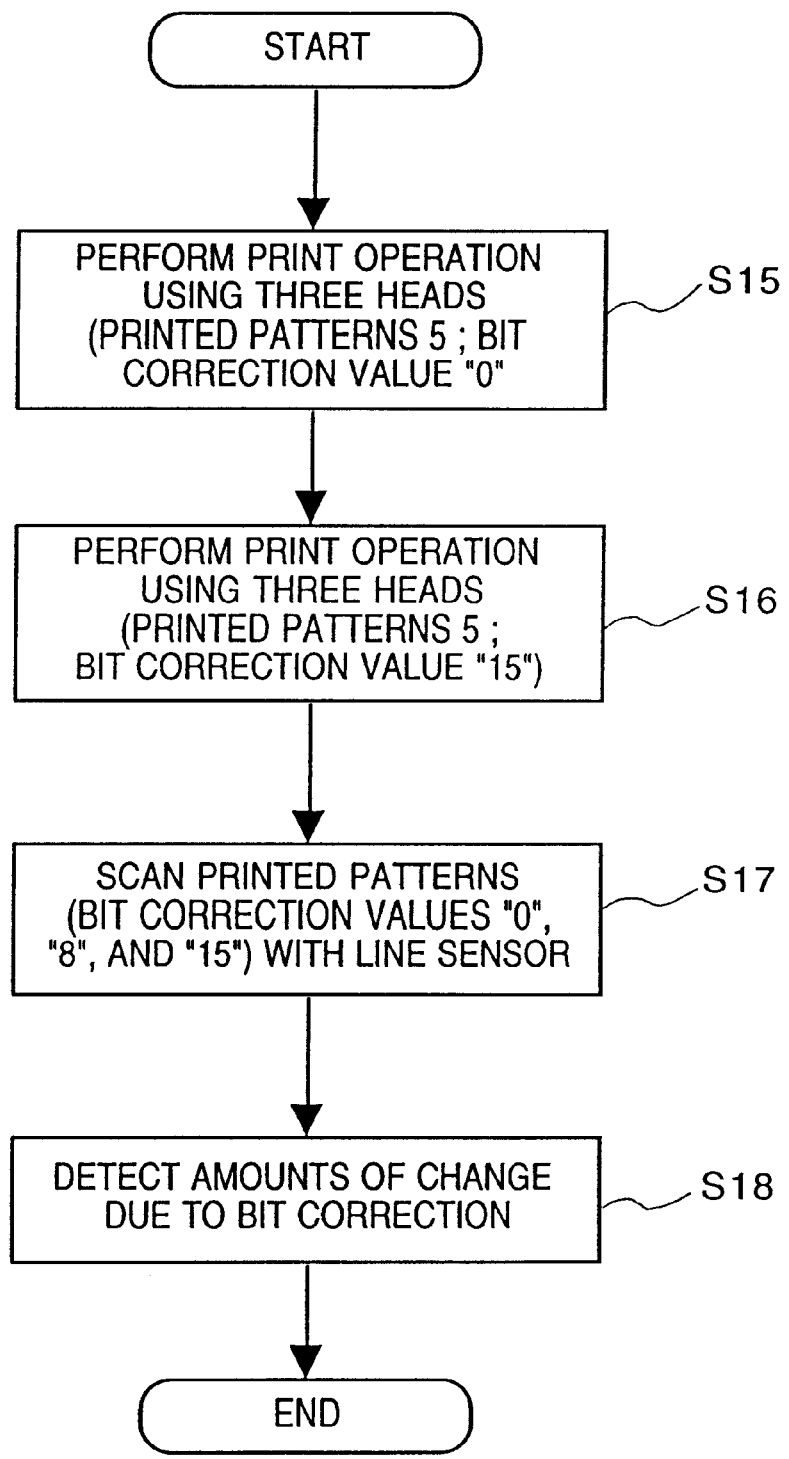
FIG. 25 is a flow chart showing a procedure for obtaining bit correction information.

FIG. 25 is a flow chart showing the detailed contents of the procedure for measuring bit correction information (step S8) in the flow chart of FIG. 20.

In this embodiment, to perform bit correction, the width of a preheat pulse is changed in 16 levels (bit correction values "0" to "15"). This bit correction information is measured to obtain information indicating how the amount of ink discharged from each nozzle changes when the width of a preheat pulse is changed by one level of the 16 levels.

The line patterns shown in FIG. 23 have already been printed with bit correction value "8" in step S6. In this case, therefore, in step S15, the line patterns shown in FIG. 23 are printed while the width of each preheat pulse is minimized (bit correction value "0").

Subsequently, the line patterns shown in FIG. 23 are printed again while the width of each preheat pulse is increased to the 16th level, i.e., to the maximum length (bit correction value "15") (step S16). As a line pattern is printed while the bit correction value is increased in this manner, the amount of ink discharged increases. The density of the line pattern therefore gradually increases.

The line sensor camera 310 is scanned over the glass substrate 302 to read the density of the line pattern with bit correction value "0", the density of the line pattern with bit correction value "8", and the density of the line pattern with the bit correction value "15" (step S17). The amounts of ink discharged from each nozzle with bit correction values "0", "8", and "15" are obtained from these pieces of density information on the basis of the above calibration curve.

With this operation, information indicating how the amount of ink discharged from each nozzle changes as the bit correction value is changed in levels, i.e., at three points corresponding to bit correction values "0", "8", and "15", is obtained. A curve passing through these three points is obtained by the least squares method in units of nozzles. On the basis of the curve obtained in this manner, a change in the amount of ink discharged from each nozzle with a change in bit correction value by one level can be obtained (step S18). That is, this curve shows the specific bit correction values (levels) for the respective nozzles, i.e., the specific widths of preheat pulses, with which the amounts of ink discharged from the respective nozzles are made equal.

In step S9 in FIG. 20, shading correction is performed on the basis of the obtained data, and bit correction is performed on the basis of the data about the above bit correction, thereby printing the line patterns shown in FIG. 23 again. The densities of these line patterns are measured by the line sensor camera 310 again. At this stage, the densities of the respective line patterns should be made almost equal.

When a multi-pass print operation is to be performed to eliminate random variations in the amounts of ink discharged after shading correction or both shading correction and bit correction, the nozzle used to color one pixel array in the scanning direction is changed in each scanning operation (one pass) in the above multi-pass printing operation. In step S10 in FIG. 20, data indicating a combination of nozzles, i.e., the specific ordinal numbers of nozzles to be used in the respective scanning operations, is generated. In generating this data, since the data about the amount of ink discharged from each nozzle after bit correction has already been obtained, a simulation for calculating ink discharging amounts is performed by using a computer in correspondence with all the combinations of nozzles, i.e., the first nozzle in the first pass and the second nozzle in the second pass; the first nozzle in the first pass and the third nozzle in the second pass; . . . , the first nozzle in the first pass and the nth nozzle in the second pass; the second nozzle in the first pass and the third nozzle in the second pass; the second nozzle in the first pass and the fourth nozzle in the second pass; . . . , and the second nozzle in the first pass and the nth nozzle in the second pass. Of these combinations, a combination with which the irregularity in total amount of ink discharged per unit length in the scanning direction for each pixel array is minimized is selected. Similarly, the above simulation calculation is performed to obtain data indicating the specific number of passes to be performed to color one pixel array so as to minimize the irregularity in total amount of ink discharged. In a multi-pass operation, however, a considerable effect can be expected even if the use of every nth nozzle and the execution of m passes are uniformly set. In this case, therefore, these settings may be fixed.

In step S11 in FIG. 20, data about an ink discharging method and nozzles to be used for the mass production of color filters is generated on the basis of the data obtained in steps S7, S9, and S10.

The mass production data obtained by the adjusting device 300 of the head unit 55 in this manner is sent to the color filter manufacturing apparatus 90. In addition, the head unit 55, whose inclination angle in the scanning operation and relative position have been adjusted by the adjusting device 300, is mounted on the manufacturing apparatus 90, and only pivot angle adjustment within a horizontal plane is performed. Thereafter, coloring of a color filter is actually performed.

A method of eliminating irregularity in coloring a color filter by using the head unit 55 having undergone adjustment in the above manner will be described next.

Prior to a description of the irregularity eliminating method of this embodiment, an existing method of coloring a color filter by the multi-pass method will be described first.

Consider a case in which a color filter is colored in three passes, with each nozzle to be used being shifted one by one in each pass. Consider one pixel array G1 of the color filter, and three adjacent nozzles N1, N2, and N3 to be used to color this pixel array. Assume that the amounts of ink discharged from these nozzles vary, i.e., the amount of ink discharged from the nozzle N1 per discharging operation is 10 ng (nanogram), the amount of ink discharged from the nozzle N2 per discharging operation is 20 ng, and the amount of ink discharged from the nozzle N3 per discharging operation is 40 ng.

The pixel array G1 is colored in one pass by using these nozzles. Assume that the length of the pixel array G1 is about 200 mm, and an ink must be discharged from the nozzle N1 2,000 times to color the pixel array G1. In this case, the total amount of ink required to color the pixel array G1 is 10 (ng)×2000=20000 ng. In general, in performing shading correction, ink discharging densities are set to equalize the total amounts of ink discharged from the respective nozzles to color one pixel array. For this reason, when the same pixel array G1 is to be colored by using the nozzle N2, an ink must be discharged 20000 (ng)÷20 (ng)=1000 times. In this case, the intervals at which an ink is discharged from the nozzle N1 to color the pixel array G1 are 200 (mm)÷2000 (times)=100 $\mu$m. When coloring is performed by using the nozzle N2, since the number of times an ink is discharged to color one pixel is ½ that in the case of the nozzle N1, the ink discharging intervals are 200 $\mu$m. Similarly, when the nozzle N3 is to be used, the number of times an ink is discharged is 20000 ng÷40 ng=500, and the ink discharging intervals are 400 $\mu$m.

In other words, when one pixel array is to be colored in one pass by using the above three nozzles with different discharging amounts, a 10-ng ink is discharged from the nozzle N1 2,000 times at 100-$\mu$m intervals; a 20-ng ink is discharged from the nozzle N2 1,000 times at 200-$\mu$m intervals; and a 40-ng ink is discharged from the nozzle N3 500 times at 400-$\mu$m intervals.

Consider a case in which one pixel array G1 is colored in three passes by using these three nozzles while the nozzle used in one pass is changed to another nozzle in another pass. In this case, an ink is generally discharged from each of the three nozzles in an amount ⅓ the total amount of ink required for coloring. According to this method, therefore, an ink is discharged from the nozzle N1 2000 (times)/3=667 times in the first pass. To equally distribute the ink discharged 667 times in the scanning direction of the pixel array G1, a 10-ng ink must be discharged at intervals of 300 $\mu$m, i.e., three times larger than 100 $\mu$m. Similarly, in the second pass, an ink is discharged 1000 (times)/3=333 times. That is, a 20-ng ink is discharged at intervals of 600 $\mu$m. In addition, an ink is discharged from the nozzle N3 500 (times)/3=167 times. That is, a 40-ng ink is discharged at intervals of 1,200 $\mu$m.

The intervals at which inks are discharged from the respective nozzles are determined in this manner. According to an existing method, inks are discharged from the respective nozzles from the same position, and each pixel array is colored in three passes. If, however, the discharging start positions in the three passes are the same, a 10-ng ink, a 20-ng ink, and a 40-ng ink overlap at the ink discharging start position and positions set at 1,200-$\mu$m intervals from the start position; a 10-ng ink and a 20-ng ink overlap at positions set at 600-$\mu$m intervals from the start position; and only a 10-ng ink is discharged at the remaining positions, as shown in FIG. 26. For this reason, as shown in FIG. 27, at the positions where the inks overlap, the landing inks spread wide on the glass substrate. However, at the positions where the inks do not overlap, the landing inks do not spread much on the glass substrate. As a result, color irregularity occurs in the pixels. Even if the discharging start positions in the respective passes are shifted from each other to solve this problem, since points corresponding to integer multiples of the intervals at which an ink is discharged in the first pass (=integer multiples of the intervals at which an ink is discharged in the nth pass+the amount of a shift from the start position) appear, overlapping of inks cannot be avoided. That is, this method does not provide a perfect solution to the above problem.

In this embodiment, therefore, the above problem is solved by the following method.

The total number of times inks must be discharged to color one pixel array in three passes is the sum of 667 for the nozzle N1, 333 for the nozzle N2, and 167 for the nozzle N3, i.e., 667+333+167=1167. In this embodiment, 1,167, the total number of times inks are discharged, is simply divided by three; the numbers of times inks are discharged from the nozzles N1, N2, and N3 are uniformly set to 1167÷3=389. In addition, the intervals at which the inks are discharged from the respective nozzles are uniformly set to the value obtained by dividing the length (200 mm) of the pixel array by 1,167, i.e., 200 (mm)÷1167=171 $\mu$m.

More specifically, as shown in FIG. 28, first of all, a 10-ng ink is discharged from the nozzle N1 at the discharging start position. Thereafter, a 10-ng ink is sequentially discharged from the nozzle N1 at intervals of 513 $\mu$m, which is three times larger than 171 $\mu$m. Discharging of the ink from the nozzle N2 is started at a position shifted from the discharging start position by 171 $\mu$m, and a 20-ng ink is discharged at 513-$\mu$m intervals. Discharging of the ink from the nozzle N3 is started at a position shifted from the discharging start position by 342 $\mu$m, and a 40-ng ink is discharged at 513-$\mu$m intervals. With this operation, all the 10-ng ink from the nozzle N1, the 20-ng ink from the nozzle N2, and the 40-ng ink from the nozzle N3 are arranged on the pixel array at equal intervals of 171 $\mu$m; no inks land in an overlapping state. With this operation, the color irregularity shown in FIGS. 26 and 27 is reduced, and a color filter with higher quality can be manufactured.

According to the above description, the numbers of times inks are discharged to color one pixel array, which should be 667 for the nozzle N1, 333 for the nozzle N2, and 167 for the nozzle N3, are uniformly set to 389. That is, the total amount of ink discharged to color one pixel array differs from that required essentially. More specifically, the total amount of ink required essentially is 10 (ng)×667+20 (ng)×333+40 (ng)×167=19890 ng, whereas the total amount of ink in this embodiment is 10 (ng)×389+20 (ng)×389+40 (ng)×389=27230 ng. In the embodiment, however, variations in the amounts of ink discharged from the respective nozzles are set to 10 ng, 20 ng, and 40 ng, i.e., greatly different values. In practice, variations in amounts of ink discharged after bit correction are about ±5% at most. If, for example, the amount of ink discharged from the first nozzle is 10 ng, the amount of ink discharged from the second nozzle is 9.5 ng, and the amount of ink discharged from the third nozzle is 10.5 ng. Even if, therefore, the numbers of times inks are discharged from the respective nozzles are made uniform, little influence is exerted on the total amount of ink discharged to color one pixel array. With the use of the method of this embodiment, therefore, any inconvenience, e.g., an ink overflow due to different total amounts of ink discharged, does not occur, but only the effect of reducing color irregularity can be obtained.

FIG. 29 shows the concept of the color filter coloring method according to this embodiment. As shown in FIG. 29, inks are discharged at equal intervals to color pixel arrays while the nozzles to be used are shifted in the first, second, and third passes. In practice, adjacent pixel arrays are colored in different colors, R, G, and B. In FIG. 29, for the sake of descriptive convenience, however, the pixel arrays are colored in the same color. In addition, the differences between the amounts of ink discharged are indicated by the nozzles with different diameters.

Figure 30:
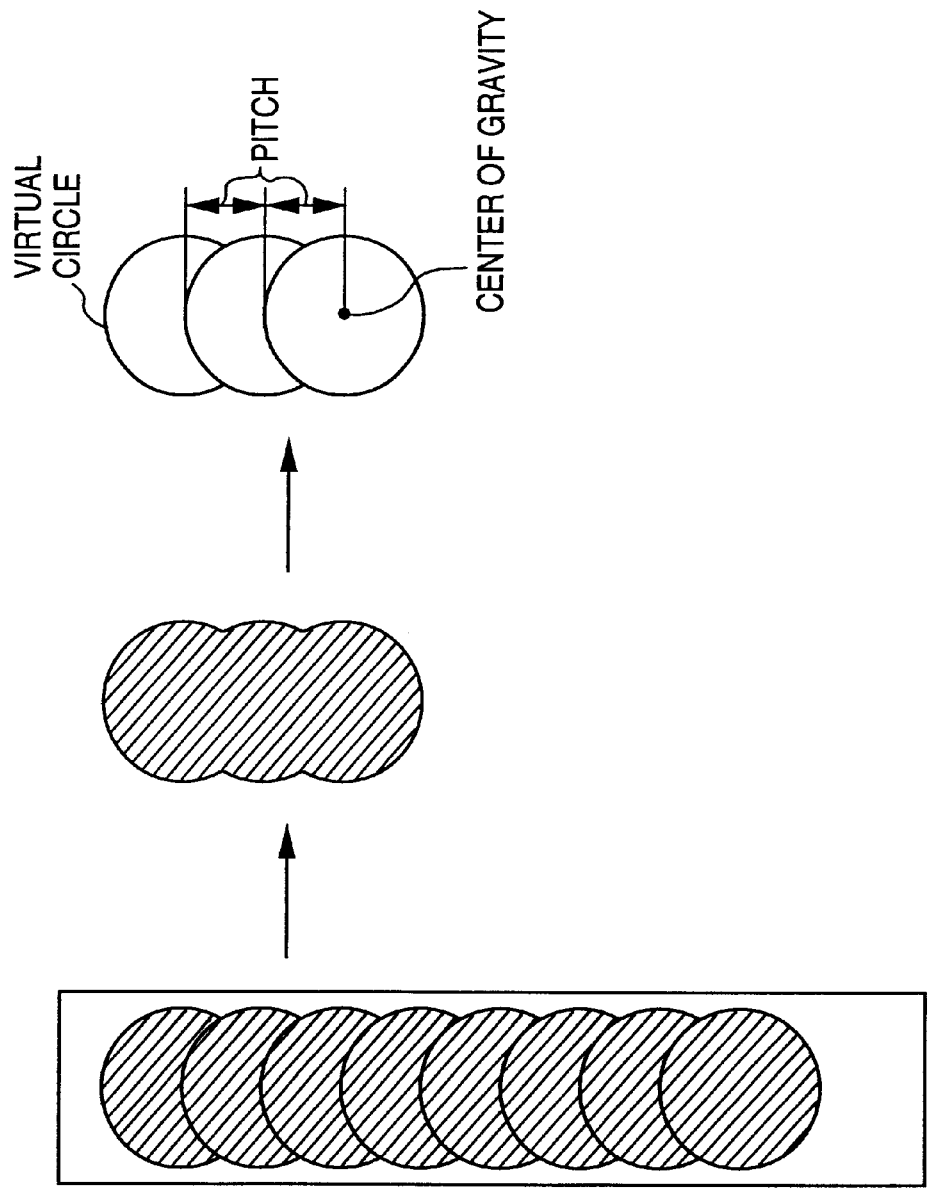
FIG. 30 is a view showing a method of verifying whether a manufactured color filter has been manufactured by the method of the present invention.

FIG. 30 is a view showing a method of verifying whether a manufactured color filter has been manufactured by the method of the present invention.

Assume that a given pixel of a manufactured color filter is colored in the manner indicated on the left end of FIG. 30, and a print mark unique to an ink-jet system is confirmed, as indicated by the central portion of FIG. 30. In this case, virtual circles of the respective ink dots are drawn on the basis of the shapes of the overlapping portions of the printed ink dots. If the virtual centers of gravity are located at an equal pitch, it can be verified that this color filter has been manufactured by the method of the present invention.

Various changes and modifications of the above embodiments can be made without departing the spirit and scope of the invention.

For example, in the above embodiment, a color filter is colored in three passes. However, the number of passes is to be determined by the above-described simulation in the embodiment, but is not limited to three.

As methods of adjusting the amounts of ink discharged, two types of methods, i.e., shading correction and bit correction, are described. However, it suffices if one of the methods is performed. In many cases, the amounts of ink discharged can be satisfactorily corrected by shading correction alone. That is, bit correction is not essential.

According to the above description, when inks are to be discharged at equal intervals, the discharging intervals are set in accordance with the distance obtained by dividing the length of each pixel array in the scanning direction by the total number of inks discharged in a plurality of scanning operations. When, however, inks are to be finally discharged discretely, if the absolute value of (Pn)−(Pn −1) (i.e., variations in discharging intervals)≦Pb (where Pb is the resolution of discharging intervals, and Pn is the intervals at which inks are discharged), the intervals can be regarded as equal intervals in the present invention.

Furthermore, when heads whose discharging amounts are uniformly compensated are to be used, the adjusting device may be used only for positioning.

According to the above description, the present invention is applied to the print apparatus of the system, among various ink-jet print systems, which has a means (e.g., an electrothermal converter or laser light) for generating heat energy as energy used to discharge an ink, and changes the state of an ink by using the heat energy. According to this system, a high-density, high-definition print operation can be realized.

As for the typical structure and principle, it is preferable that the basic structure disclosed in, for example, U.S. Pat. Nos. 4,723,129 or 4,740,796 is employed. The above method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electrothermal converter disposed to face a sheet or a fluid passage which holds the fluid (ink) to a level higher than levels at which film boiling takes place, are applied to the electrothermal converter in accordance with print information so as to generate heat energy in the electrothermal converter and to cause the heat effecting surface of the print head to generate film boiling so that bubbles can be formed in the fluid (ink) to correspond to the one or more drive signals. The enlargement/contraction of the bubble will cause the fluid (ink) to be discharged through a discharging opening so that one or more inks are formed. If a pulse shape drive signal is employed, the bubble can be enlarged/contracted immediately and properly, causing a further preferred effect to be obtained because the fluid (ink) can be discharged while revealing excellent responsiveness.

It is preferable that a pulse drive signal disclosed in U.S. Pat. Nos. 4,463,359 or 4,345,262 is employed. If conditions disclosed in U.S. Pat. No. 4,313,124 which is an invention relating to the temperature rising ratio at the heat effecting surface are employed, a satisfactory print result can be obtained.

As an alternative to the structure (linear fluid passage or perpendicular fluid passage) of the print head disclosed in each of the above inventions and having an arrangement that discharge ports, fluid passages and electrothermal converters are combined, a structure having an arrangement that the heat effecting surface is disposed in a bent region and disclosed in U.S. Pat. Nos. 4,558,333 or 4,459,600 may be employed. In addition, the following structures may be employed: a structure having an arrangement that a common slit is formed to serve as a discharge section of a plurality of electrothermal converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a print head of the full line type having a length corresponding to the maximum width of a recording medium which can be printed by the print apparatus, either the construction which satisfies its length by a combination of a plurality of print heads as disclosed in the above specifications or the construction as a single full line type print head which has integrally been formed can be used.

In addition, the invention is effective for a print head of the freely exchangeable chip type which enables electrical connection to the print apparatus main body or supply of ink from the main device by being mounted onto the apparatus main body, or for the case by use of a print head of the cartridge type provided integrally on the print head itself.

It is preferred to additionally employ the print head restoring means and the auxiliary means provided as components of the present invention because the effect of the present invention can be further stabilized thereby. Specifically, it is preferable to employ a print head capping means, a cleaning means, a pressurizing or suction means, an electrothermal converter, another heating element or a preheating means constituted by combining them and a pre-discharging mode in which a discharging operation is performed independently from the print operation in order to stably perform the print operation.

Although a fluid ink is employed in the above embodiments of the present invention, an ink which solidifies at the room temperature or lower, or an ink which softens or liquifies at the room temperature may be used. That is, any ink which liquifies when a print signal is supplied may be used.

Furthermore, an ink which is solidified when it is caused to stand, and liquified when heat energy is supplied in accordance with a print signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a print signal so as to be discharged in the form of fluid ink, or an ink which is liquified only after heat energy is supplied, e.g., an ink which starts to solidify when it reaches a recording medium, can be adapted to the present invention. In the above case, the ink may be of a type which is held as fluid or solid material in a recess of a porous sheet or a through hole at a position to face the electrothermal converter as disclosed in Japanese Patent Laid-Open No. 54-56847 or Japanese Patent Laid-Open No. 60-71260. It is the most preferred way for the ink to be adapted to the above film boiling method.

As has been described above, according to the present invention, since all the intervals at which inks are discharged in a plurality of scanning direction are made equal, concentration of inks on one portion in each pixel array can be prevented. A color filter with little color irregularity can therefore be manufactured.

The present invention is not limited to the above embodiments and various changes and modifications can be made within the spirit and scope of the present invention. Therefore, to apprise the public of the scope of the present invention the following claims are made.

What is claimed is:

1. A method of manufacturing a color filter by coloring each of a plurality of filtering portion arrays, each filtering portion array including a plurality of filtering portions arranged on one line extending in a predetermined direction, using a plurality of inks discharged from a plurality of different ink discharge nozzles, by discharging inks from the plurality of different ink discharge nozzles to a substrate with the plurality of filtering portion arrays, said method comprising the steps of:

determining discharge intervals between the plurality of inks discharged from the plurality of different ink discharge nozzles to one filtering portion array based on amounts of the plurality of inks discharged from the plurality of different ink discharge nozzles to color the one filtering portion array; and coloring the one filtering portion array by discharging the plurality of inks from the plurality of different ink discharge nozzles based on the discharge intervals between the plurality of inks determined in said determining step, wherein, in said determining step, one value is assigned to the discharge intervals between the plurality of inks discharged from the plurality of different ink discharge nozzles used for coloring the one filtering portion array so that each of the discharge intervals between the plurality of inks is substantially equal, and the one value varies in accordance with a total amount of the plurality of inks discharged onto the one filtering portion array from the plurality of different ink discharge nozzles, and wherein, in said coloring step, the plurality of inks are discharged from the plurality of ink discharge nozzles in such a manner that all of the plurality of inks land on the one filtering portion array at positions that are spaced apart from one another by equal intervals.

2. A method of manufacturing a color filter according to claim 1, wherein adjacent inks of the plurality of inks discharged to the one filtering portion array partially overlap each other and the one filtering portion array is filled overall with the plurality of inks.

3. A method of manufacturing a color filter according to claim 1, wherein the plurality of inks are discharged from the plurality of ink discharge nozzles by relative scanning operations of the plurality of ink discharge nozzles and the substrate.

4. The method of manufacturing a color filter according to claim 1, wherein the inks are discharged by generating heat energy and applying the heat energy to the inks.

5. An apparatus for manufacturing a color filter by coloring each of a plurality of filtering portion arrays, each filtering portion array including a plurality of filtering portions arranged on one line extending in a predetermined direction, using a plurality of inks discharged from a plurality of different ink discharge nozzles, by discharging inks from the plurality of different ink discharge nozzles to a substrate with the plurality of filtering portion arrays, said apparatus comprising:

an ink-jet head with the plurality of ink discharge nozzles;

determining means for determining discharge intervals between the plurality of inks discharged from the plurality of different ink discharge nozzles to one filtering portion array based on amounts of the plurality of inks discharged from the plurality of different ink discharge nozzles to color the one filtering portion array; and control means for controlling said ink-jet head to perform a coloring operation for coloring the one filtering portion array by discharging the plurality of inks from the plurality of different ink discharge nozzles based on the discharge intervals between the plurality of inks determined by said determining means, wherein said determining means assigns one value to the discharge intervals between the plurality of inks discharged from the plurality of different ink discharge nozzles used for coloring the one filtering portion array so that each of the discharge intervals between the plurality of inks is substantially equal, and the one value varies in accordance with a total amount of the plurality of inks discharged onto the one filtering portion array from the plurality of different ink discharge nozzles, and wherein said control means controls said ink-jet head to discharge the plurality of inks from the plurality of ink discharge nozzles in such a manner that all of the plurality of inks land on the one filtering portion array at positions that are spaced apart from one another by equal intervals.

6. An apparatus for manufacturing a color filter according to claim 5, wherein adjacent inks of the plurality of inks discharged to the one filtering portion array partially overlap each other and the one filtering portion array is filled overall with the plurality of inks.

7. An apparatus for manufacturing a color filter according to claim 5, wherein the plurality of inks are discharged from the plurality of ink discharge nozzles by relative scanning operations of the plurality of ink discharge nozzles and the substrate.

8. The apparatus for manufacturing a color filter according to claim 5, wherein said ink-jet head is a head for discharging an ink by using heat energy, with the head including a heat energy generator for generating heat energy, which is applied to the ink.

9. A method of manufacturing a color filter by coloring each of a plurality of filtering portions using a plurality of inks discharged from a plurality of different ink discharge nozzles, by discharging inks from the plurality of different ink discharge nozzles to a substrate with the plurality of filtering portions, said method comprising the steps of:

determining discharge intervals between the plurality of inks discharged from the plurality of different ink discharge nozzles to one filtering portion based on amounts of the plurality of inks discharged from the plurality of different ink discharge nozzles to color the one filtering portion; and coloring the one filtering portion by discharging the plurality of inks from the plurality of different ink discharge nozzles based on the discharge intervals between the plurality of inks determined in said determining step, wherein, in said determining step, one value is assigned to the discharge intervals between the plurality of inks discharged from the plurality of different ink discharge nozzles used for coloring the one filtering portion so that each of the discharge intervals between the plurality of inks is substantially equal, and the one value varies in accordance with a total amount of the plurality of inks discharged onto the one filtering portion from the plurality of different ink discharge nozzles, and wherein, in said coloring step, the plurality of inks are discharged from the plurality of ink discharge nozzles in such a manner that all of the plurality of inks land on the one filtering portion at positions that are spaced apart from one another by equal intervals.

10. A method of manufacturing a color filter according to claim 9, wherein adjacent inks of the plurality of inks discharged to the one filtering portion partially overlap each other and the one filtering portion is filled overall with the plurality of inks.

11. A method of manufacturing a color filter according to claim 9, wherein the plurality of inks are discharged from the plurality of ink discharge nozzles by relative scanning operations of the plurality of ink discharge nozzles and the substrate.

12. The method of manufacturing a color filter according to claim 9, wherein the inks are discharged by generating heat energy and applying the heat energy to the inks.

13. An apparatus for manufacturing a color filter by coloring each of a plurality of filtering portions using a plurality of inks discharged from a plurality of different ink discharge nozzles, by discharging inks from the plurality of different ink discharge nozzles to a substrate with the plurality of filtering portions, said apparatus comprising:

an ink-jet head with the plurality of ink discharge nozzles;

determining means for determining discharge intervals between the plurality of inks discharged from the plurality of different ink discharge nozzles to one filtering portion based on amounts of the plurality of inks discharged from the plurality of different ink discharge nozzles to color the one filtering portion; and control means for controlling said ink-jet head to perform a coloring operation for coloring the one filtering portion by discharging the plurality of inks from the plurality of different ink discharge nozzles based on the discharge intervals between the plurality of inks determined by said determining means, wherein said determining means assigns one value to the discharge intervals between the plurality of inks discharged from the plurality of different ink discharge nozzles used for coloring the one filtering portion so that each of the discharge intervals between the plurality of inks is substantially equal, and the one value varies in accordance with a total amount of the plurality of inks discharged onto the one filtering portion from the plurality of different ink discharge nozzles, and wherein said control means controls said ink-jet head to discharge the plurality of inks from the plurality of ink discharge nozzles in such a manner that all of the plurality of inks land on the one filtering portion at positions that are spaced apart from one another by equal intervals.

14. An apparatus for manufacturing a color filter according to claim 13, wherein adjacent inks of the plurality of inks discharged to the one filtering portion partially overlap each other and the one filtering portion is filled overall with the plurality of inks.

15. An apparatus for manufacturing a color filter according to claim 13, wherein the plurality of inks are discharged from the plurality of ink discharge nozzles by relative scanning operations of the plurality of ink discharge nozzles and the substrate.

16. The apparatus for manufacturing a color filter according to claim 13, wherein said ink-jet head is a head for discharging an ink by using heat energy, with the head including a heat energy generator for generating heat energy, which is applied to the ink.

* * * * *